US010709261B2

(12) United States Patent
Wang et al.

(10) Patent No.: US 10,709,261 B2
(45) Date of Patent: Jul. 14, 2020

(54) BABY CARRIER

(71) Applicant: BridgeHub LLC, San Jose, CA (US)

(72) Inventors: Yongmei Wang, San Jose, CA (US); Xinlin Ye, Beijing (CN); Ting Wang, Shandong (CN); Jianyong Zhou, Beijing (CN)

(73) Assignee: BridgeHub LLC, San Jose, CA (US)

( * ) Notice: Subject to any disclaimer, the term of this patent is extended or adjusted under 35 U.S.C. 154(b) by 0 days.

(21) Appl. No.: 15/879,157

(22) Filed: Jan. 24, 2018

(65) Prior Publication Data

US 2018/0148081 A1 May 31, 2018

Related U.S. Application Data

(60) Division of application No. 15/411,433, filed on Jan. 20, 2017, now abandoned, which is a
(Continued)

(51) Int. Cl.
*A47D 13/02* (2006.01)
*B62B 7/06* (2006.01)
(Continued)

(52) U.S. Cl.
CPC .......... *A47D 13/025* (2013.01); *A47D 1/004* (2013.01); *B62B 7/044* (2013.01); *B62B 7/06* (2013.01);
(Continued)

(58) Field of Classification Search
CPC ........ A47D 1/10; A47D 13/02; A47D 13/025; A45B 5/00; A47C 9/10; A47C 9/025
(Continued)

(56) References Cited

U.S. PATENT DOCUMENTS 690,122 A 12/1901 Slagle
2,844,905 A 7/1958 Musser et al.
(Continued)

FOREIGN PATENT DOCUMENTS

EP 355223 2/1990
EP 1746378 1/2007
(Continued)

OTHER PUBLICATIONS

International Search Report and Written Opinion of the International Searching Authority, PCT Application No. PCT/US2015/023537, dated Jul. 1, 2015.

*Primary Examiner* — Noah Chandler Hawk
(74) *Attorney, Agent, or Firm* — Fish & Richardson P.C.

(57) ABSTRACT

An improved baby carrier is disclosed that includes a support frame coupled to a seating assembly though a suspension mechanism to provide weight support for a baby or toddler. The baby carrier includes an attachment harness worn by an adult to provide non-slip coupling between the baby carrier and the adult. The baby carrier also includes a semi-rigid coupling between the seat and harness assembly, a seat height adjustment capability, a sturdy support frame configuration, and a braking system. The baby carrier is a structurally stable device, and during use, significantly reduces the load of carrying the baby or toddler on the adult. Further, the baby carrier can have a compact size in a "stowed mode" for mobility, and can be used to meet a variety of user needs and carrying scenarios.

23 Claims, 24 Drawing Sheets

Related U.S. Application Data continuation-in-part of application No. 14/981,744, filed on Dec. 28, 2015, now abandoned, which is a division of application No. 14/243,818, filed on Apr. 2, 2014, now abandoned.

(51) Int. Cl.
  *B62B 7/04* (2006.01)
  *B62B 9/08* (2006.01)
  *B62B 9/24* (2006.01)
  *A47D 1/00* (2006.01)

(52) U.S. Cl.
  CPC ............ *B62B 9/087* (2013.01); *B62B 9/24* (2013.01); *B62B 2205/06* (2013.01); *B62B 2205/145* (2013.01)

(58) Field of Classification Search
  USPC ...... 297/129, 195.11, 217.1, 256.16, 440.24, 297/4, 484, 464, 485; 135/66, 85; 224/158, 159, 160, 161
  See application file for complete search history.

(56) References Cited

U.S. PATENT DOCUMENTS

| | | | |
|---|---|---|---|
| 3,103,375 A | 9/1963 | McMullin | |
| 3,893,730 A | 7/1975 | Homier et al. | |
| 4,101,163 A | 7/1978 | Morin | |
| 4,160,553 A | 7/1979 | Fleischer | |
| 4,232,896 A | 11/1980 | Caldwell et al. | |
| 4,253,658 A | 3/1981 | Fleischer | |
| 4,366,981 A | 1/1983 | Ziegler et al. | |
| 4,385,849 A | 5/1983 | Crain | |
| 4,467,945 A | 8/1984 | Schaapveld | |
| 4,528,998 A | 7/1985 | Gamm | |
| 4,746,044 A | 5/1988 | Arvizu et al. | |
| 4,790,459 A | 12/1988 | Moseley | |
| 4,932,719 A | 6/1990 | Gonzalez y. Rojas | |
| 4,948,120 A | 8/1990 | Krueger et al. | |
| 4,976,494 A | 12/1990 | Polley | |
| 5,005,902 A | 4/1991 | Farnworth et al. | |
| 5,188,138 A * | 2/1993 | Yamasaki ............... A61H 3/04 135/65 | |
| 5,205,450 A | 4/1993 | Derosier | |
| 5,222,641 A | 6/1993 | Medeiros, Jr. | |
| 5,242,212 A | 9/1993 | Polley | |
| 5,315,795 A | 5/1994 | Chae et al. | |
| 5,380,023 A | 1/1995 | McBee | |
| 5,425,526 A | 6/1995 | Shen | |
| 5,441,186 A | 8/1995 | Halligan | |
| 5,509,590 A | 4/1996 | Medeiros et al. | |
| 5,575,448 A | 11/1996 | Battocchio | |
| 5,641,147 A | 6/1997 | Pena | |
| 5,662,429 A | 9/1997 | Battocchio | |
| 5,664,758 A | 9/1997 | Smith | |
| 5,676,287 A | 10/1997 | Huang | |
| 5,769,104 A | 6/1998 | Uemura | |
| 5,848,741 A | 12/1998 | Fair et al. | |
| 5,921,628 A | 7/1999 | Glockl | |
| 5,927,797 A | 7/1999 | Ferguson | |
| 5,971,341 A | 10/1999 | Pfister | |
| 6,006,970 A | 12/1999 | Piatt | |
| 6,062,638 A * | 5/2000 | Ferguson ............... A47C 9/025 297/4 | |
| 6,345,745 B1 | 2/2002 | Harriss | |
| 6,443,339 B1 | 9/2002 | Higuchi | |
| 6,594,856 B1 | 7/2003 | Cherukuri | |
| 6,663,071 B2 | 12/2003 | Peterson | |
| 6,719,257 B1 | 4/2004 | Greene et al. | |
| 6,783,135 B1 | 8/2004 | Nord | |
| 6,789,710 B1 | 9/2004 | Szatkowski | |
| 6,854,916 B2 | 2/2005 | Hsieh | |
| 6,866,174 B2 | 3/2005 | Hiscocks | |
| 6,877,805 B1 | 4/2005 | Steadman | |
| 6,883,530 B2 | 4/2005 | Kawakami | |
| 7,104,203 B2 | 9/2006 | Lo | |
| 7,344,320 B2 | 3/2008 | Barker et al. | |
| 7,396,083 B2 | 7/2008 | Kasner | |
| 7,547,067 B2 | 6/2009 | Keilhauer et al. | |
| 7,594,696 B2 | 9/2009 | Girard | |
| 7,610,711 B2 | 11/2009 | Oz | |
| 7,673,942 B2 | 3/2010 | Tuckey et al. | |
| 7,686,195 B2 | 3/2010 | Bangert | |
| 7,775,548 B2 | 8/2010 | Mcintyre et al. | |
| 7,823,599 B2 | 11/2010 | Thibodeau et al. | |
| 7,845,602 B1 | 12/2010 | Young et al. | |
| 7,883,426 B2 | 2/2011 | Bellows et al. | |
| 7,992,584 B1 * | 8/2011 | Birnbaum ............... A61H 3/04 135/67 | |
| 8,020,881 B2 * | 9/2011 | Stump ............... A61H 3/04 280/200 | |
| 8,028,963 B2 | 10/2011 | Speggiorin | |
| 8,056,779 B1 | 11/2011 | Brunwin | |
| 8,147,345 B2 | 4/2012 | Furman | |
| 8,156,581 B2 | 4/2012 | Fogleman | |
| 8,157,225 B2 | 4/2012 | Kephart | |
| 8,161,956 B2 | 4/2012 | Bednar | |
| 8,286,977 B2 | 10/2012 | Butler et al. | |
| 8,292,365 B2 | 10/2012 | Lu et al. | |
| 8,403,408 B2 | 3/2013 | Hosier | |
| 8,443,538 B2 | 5/2013 | Moody | |
| 8,464,919 B1 | 6/2013 | Goozdich | |
| 8,500,140 B1 | 8/2013 | Liao | |
| 8,523,028 B1 | 9/2013 | Young | |
| 8,534,427 B2 | 9/2013 | Kumazawa | |
| 8,540,314 B2 | 9/2013 | Fernandez | |
| 8,556,349 B2 | 10/2013 | Welch et al. | |
| 8,584,622 B2 | 11/2013 | Nishino | |
| 2002/0050112 A1 | 5/2002 | Koch et al. | |
| 2005/0242630 A1 | 11/2005 | Miller | |
| 2006/0240960 A1 * | 10/2006 | Shahinpoor ............ A63B 69/18 482/121 | |
| 2011/0109138 A1 | 5/2011 | Inoue et al. | |
| 2011/0198905 A1 | 8/2011 | Welch et al. | |
| 2012/0006949 A1 | 1/2012 | Laird et al. | |
| 2012/0152988 A1 | 6/2012 | Green, III | |
| 2013/0047331 A1 | 2/2013 | Parker et al. | |
| 2015/0230623 A1 | 8/2015 | Oh et al. | |

FOREIGN PATENT DOCUMENTS

| | | | |
|---|---|---|---|
| FR | 2997826 A1 * | 5/2014 | ............ A45B 1/02 |
| GB | 678225 | 8/1952 | |
| GB | 2270619 | 3/1994 | |
| KR | 101219312 | 1/2013 | |

\* cited by examiner

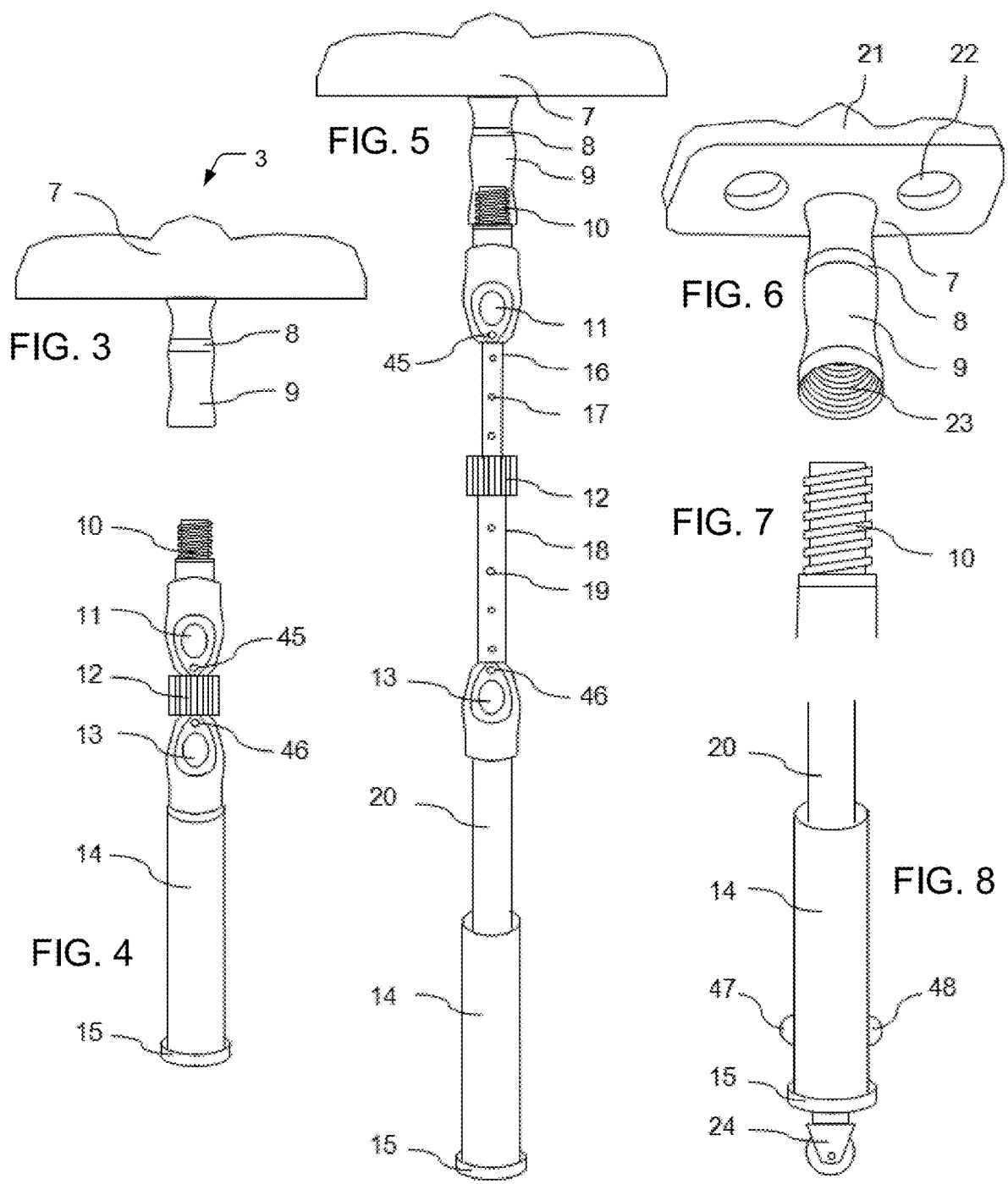

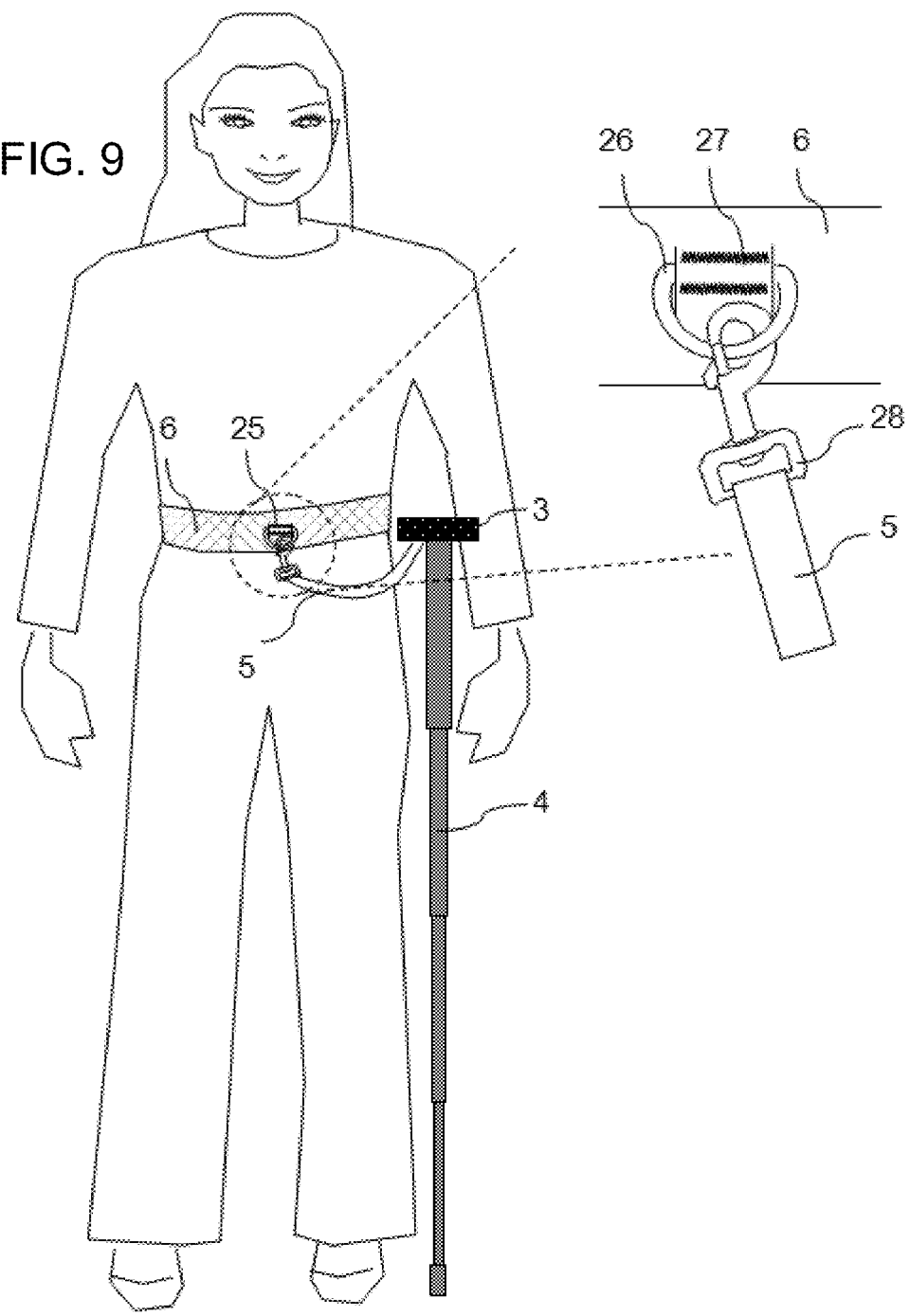

BABY CARRIER

CROSS-REFERENCE TO RELATED APPLICATIONS

This application is a divisional and claims priority to U.S. patent application Ser. No. 15/411,433, entitled "Baby Carrier," filed on Jan. 20, 2017, which is a continuation-in-part of and claims priority to U.S. patent application Ser. No. 14/981,744, entitled "Baby Carrier," filed on Dec. 28, 2015, which is a divisional of U.S. patent application Ser. No. 14/243,818, entitled "Baby Carrier," filed on Apr. 2, 2014. The entire contents of the aforementioned applications are incorporated herein by reference.

TECHNICAL FIELD

This disclosure is related generally to baby carriers.

BACKGROUND

Conventional baby carriers often deploy a flexible strap or rigged harness that attaches the baby to the upper body of an adult. When carrying the baby for an extended period of time the weight of the baby can inflict physical stress on the body of the carrying adult, resulting in discomfort. Additionally, many baby carriers specify a carrying weight upper bound that prevents use of the baby carrier for heavier babies or toddlers.

SUMMARY

An improved baby carrier is disclosed that includes a monopod leg coupled to a sitting element for supporting the weight of a baby or toddler. In some implementations, the baby carrier includes a detachable sitting element coupled to the monopod leg to support the carrying load and an attachment harness to attach the sitting element and monopod leg to a carrying individual. The monopod leg can be telescopic and include controls for coarse and fine height adjustment of the sitting element, covering a range from, for example, below to above the waist level of the carrying individual. The monopod leg includes a mounting head that securely supports the sitting element. The sitting element has a profile designed for sitting comfort under a variety of holding positions as well as compactness.

The attachment harness securely attaches the sitting element and monopod leg to a waistband worn by the carrying individual using an attachment cable. In some implementations, the attachment harness can include a baby waistband that attaches to the waistband and/or shoulder straps worn by the carrying individual using attachment cables and clips. Other features include but are not limited to: a non-skid or non-sink tip or roller wheel tip for the monopod leg, retractable support legs, sitting element profile variations and shoulder strap and waistband attachment adjustment.

In some implementations, the baby carrier includes a wheeled support frame coupled to a monopod supporting a sitting element. In some implementations, the wheeled support frame is a tripod frame with three wheels. In other implementations, the wheeled support frame can include more than three legs (e.g., four legs with wheels). In some implementations, each leg of the wheeled support frame can be telescopically adjusted. The wheels can include brakes. The wheeled support frame can be a wheeled tripod support frame with three wheels.

In some implementations, a baby carrier includes an adjustable support frame having a plurality of legs. Each leg includes a respective leg end configured to contact a floor surface. The baby carrier also includes an adjustable seating assembly attached to the support frame and configured to support a baby or a toddler. The baby carrier also includes an attachment harness attached to at least one of the support frame or the seating assembly. The attachment harness is configured to secure the baby carrier to an adult. The baby carrier is configured, such that in a deployed arrangement, each of the leg ends of the support frame contacts the floor surface, and the seating assembly is supported above the floor surface.

A baby carrier can include one or more of the following features.

In some implementations, the baby carrier can include a suspension assembly disposed between the support frame and the seating assembly. The suspension assembly can be configured to provide shock absorption between the support frame and the seating assembly.

In some implementations, at least one leg end can include a wheel assembly.

In some implementations, at least one leg end can include a brake.

In some implementations, the baby carrier can be further configured, such that in the deployed arrangement, each leg end is disposed along a common first plane extending along an x-axis and a y-axis in a Cartesian coordinate system, a first leg of the plurality of legs is inclined with respect to an z-axis of the Cartesian coordinate system by a first pitch angle, and a second leg of the plurality of legs is inclined with respect to the z-axis by a second pitch angle. The first pitch angle can be different than the second pitch angle.

In some implementations, the first pitch angle can be between 10° and 25°, and the second pitch angle can be between 15° and 30°.

In some implementations, the first pitch angle can be between 5° and 20°, and the second leg can be inclined with respect to the first leg by 25° to 45°.

In some implementations, the baby carrier can be further configured, such that in the deployed arrangement, a third leg of the plurality of legs is inclined with respect to the z-axis by the second pitch angle.

In some implementations, the baby carrier can be further configured, such that in the deployed arrangement, the first leg is substantially parallel to a second plane extending along the x-axis and a z-axis, the second leg is inclined with respect to the x-axis by a first roll angle, and the third the second leg is inclined with respect to the x-axis by a second roll angle. The first roll angle and the second roll angle can be substantially equal.

In some implementations, the first roll angle and the second roll angle can be between 10° and 30°.

In some implementations, the seating assembly can include a support arm attached to the support frame. The baby carrier can be further configured, such that in the deployed arrangement, the support arm is inclined with respect to the z-axis by the first pitch angle.

In some implementations, the baby carrier can be further configured, such that in a second deployed position each leg end is disposed along the first plane, and the first leg is substantially orthogonal to the first plane.

In some implementations, the second leg can be coupled to the first leg through a sleeve coupling encircling a portion of the first leg, and wherein the sleeve coupling is configured to slide along a length of the first leg.

In some implementations, at least one leg can be telescopic.

In some implementations, at least one leg can include a first leg portion and a second leg portion. The first leg portion, the second leg portion, and the support frame can be configured to telescope with respect to one another.

In some implementations, the first leg portion, the second leg portion, and the support frame can be approximately equal in length.

In some implementations, the baby carrier can be further configured, such that in a stowed arrangement, each leg is substantially parallel to each other leg.

In some implementations, the adjustable support frame can include at least three legs.

In some implementations, a first leg of the plurality of legs can be longer or shorter than a second leg of the plurality of legs.

In some implementations, the leg end of the first leg can include a first wheel. The second leg end of the second leg can include a second wheel. The first wheel can have a larger diameter than the second wheel.

In some implementations, the first wheel can include a Mecanum wheel.

In some implementations, the leg end of the second leg can include a brake.

In some implementations, the brake can be configured to apply a variable braking force for the second wheel. The variable braking force can depend on an angle of incline of the support frame with respect to a vertical axis.

In some implementations, the variable braking force can monotonically increase as the angle of incline increases.

In some implementations, the brake can be configured to lock the second wheel when the angle of incline exceeds a threshold angle.

In some implementations, a rotation of at least one of the first wheel or the second wheel can be restricted with respect to a first direction relative to a rotation in a second direction opposite the first direction.

In some implementations, the attachment harness can include at least one shoulder strap configured to secure the attachment harness to a shoulder of the adult.

In some implementations, the seating assembly can include a second attachment harness configured to secure the baby or toddler to the seating assembly.

In some implementations, the attachment harness can include at least two rigid or semi-rigid support links attached to at least one of the support frame or the seating assembly.

In some implementations, the at least two support links can include a first support link disposed on a first side of the seating assembly, and a second support link disposed on a second side of the seating assembly opposite the first side.

In some implementations, the seating assembly can include a seat having a curved back portion configured to support a back of the baby or the toddler.

In some implementations, the seat can include a shock absorption mechanism.

In some implementations, the shock absorption mechanism can be configured such that it is more rigid with respect to a first axis of rotation than with respect to a second axis of rotation.

In some implementations, the baby carrier can be configured, such that in the deployed configuration, and when the baby or toddler is positioned on the seating assembly and the attachment harness is secured to the adult, the attachment harness supports at least a portion of a weight of the baby or the toddler.

In some implementations, the baby carrier can be configured, such that in the deployed arrangement, and when the baby or toddler is positioned on the seating assembly the attachment harness is secured to the adult, and the baby carrier is being moved by the adult, the support frame supports at least 90% of a portion of a weight of the baby or the toddler.

In some implementations, the baby carrier can be configured, such that in the deployed arrangement, and when the baby or toddler is positioned on the seating assembly the attachment harness is secured to the adult, and the baby carrier is stationary, the support frame supports at least 80% of a portion of a weight of the baby or the toddler.

In some cases, an advantage of the disclosed baby carrier over conventional baby carries is that it is designed to offload the weight of the baby or toddler to a monopod leg, resulting in less physical stress on the carrying adult. Further, in some cases, a rigid coupling between the seating assembly and the support frame, together with a semi-rigid coupling between the seating assembly and attachment harness, enable the seating assembly to be raised from below by the support frame to provide weight support from ground. A variety of other features of the baby carrier described herein provide additional advantages over conventional baby carriers for certain consumer groups and usage scenarios. The wheeled support frame provides stable mobile transport structure that can be used with a variety of baby/toddler carrying positions.

In some cases, a baby carrier includes a ground support frame rigidly coupled to seating assembly to provide weight support for baby or toddler, significantly offload the carrying load for adult. The attachment harness worn by the adult enables non-slip coupling of the baby carrier to the adult.

In some cases, together with the semi-rigid coupling between the seating assembly and the attachment harness, the restriction to the seat assembly's six degrees of freedom (e.g., less in Y than X or Z, less in pitch than in yaw or roll) enables smooth deployment and operation using the baby carrier. A suspension system may be included to provide a less bumpy ride for the baby or toddler during use of the baby carrier.

In some cases, the seat height adjustment capability, together with innovative support frame configuration and braking technique enables structurally stable device to significantly reduce carrying load from the adult during operation and/or to provide a compact size and light weight in stowed mode for mobility, which fits different needs of individuals and carrying scenarios.

The details of the disclosed implementations are set forth in the accompanying drawings and the description below. Other features, objects, and advantages will be apparent from the description and drawings, and from the claims.

DESCRIPTION OF DRAWINGS

FIG. 3 is a front view of the sitting element showing an attachment ring of a monopod leg cable for attaching to the adult waistband and an attachment handle for attaching the sitting element to a monopod leg head mount.

FIG. 4 is a front view of the telescopic monopod leg in a compact profile showing primary and secondary height control buttons for coarse and fine height adjustment of the sitting element and a mounting head.

FIG. 5 is a front view of the telescopic monopod leg in an extended profile showing the sitting element mounted on the top of the telescopic monopod leg.

FIG. 6 is a perspective view of the sitting element.

FIG. 7 is a detailed view of the monopod leg head mount shown in FIG. 4.

FIG. 8 is a front view of the monopod leg with an optional wheel support.

FIG. 9 is a front view of the baby carrier with the adult waistband on an adult and a detailed view of the monopod leg cable attached to the adult waistband.

DETAILED DESCRIPTION

Figure 1:
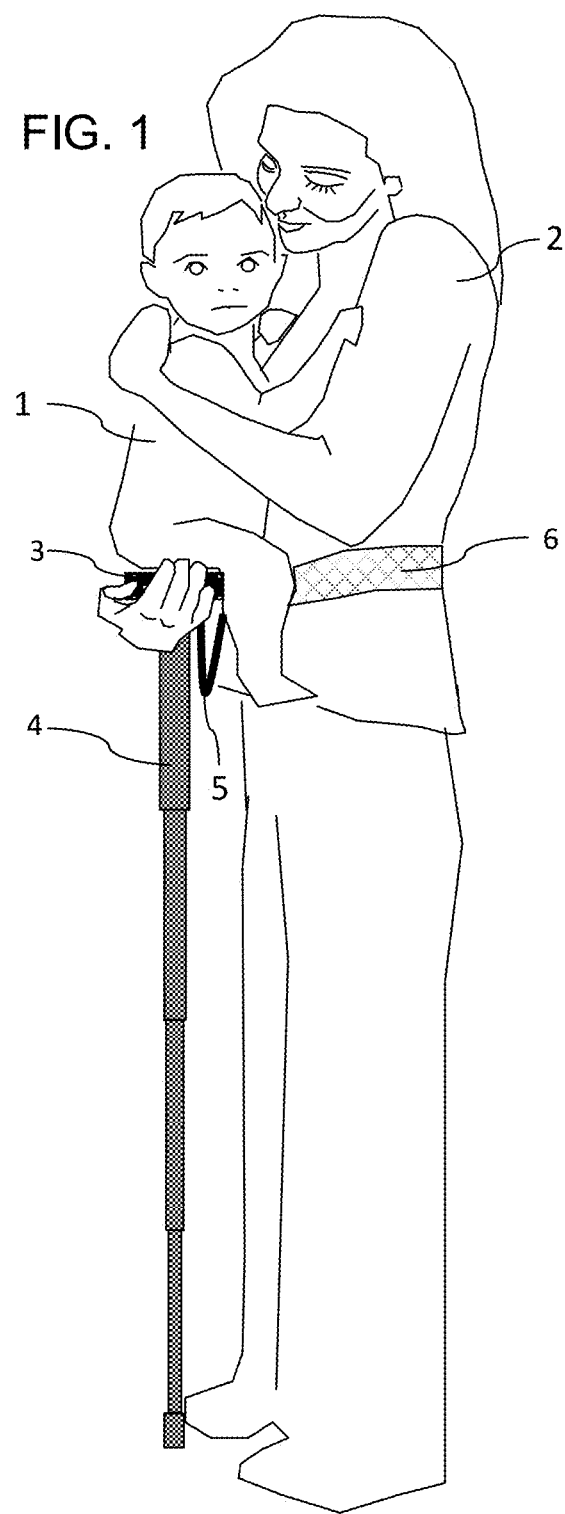
FIG. 1 illustrates the baby carrier in operation where an adult is holding a baby in the front and the baby is sitting on a sitting element coupled to a telescopic monopod leg that is attached to an adult waistband.
Figure 2:
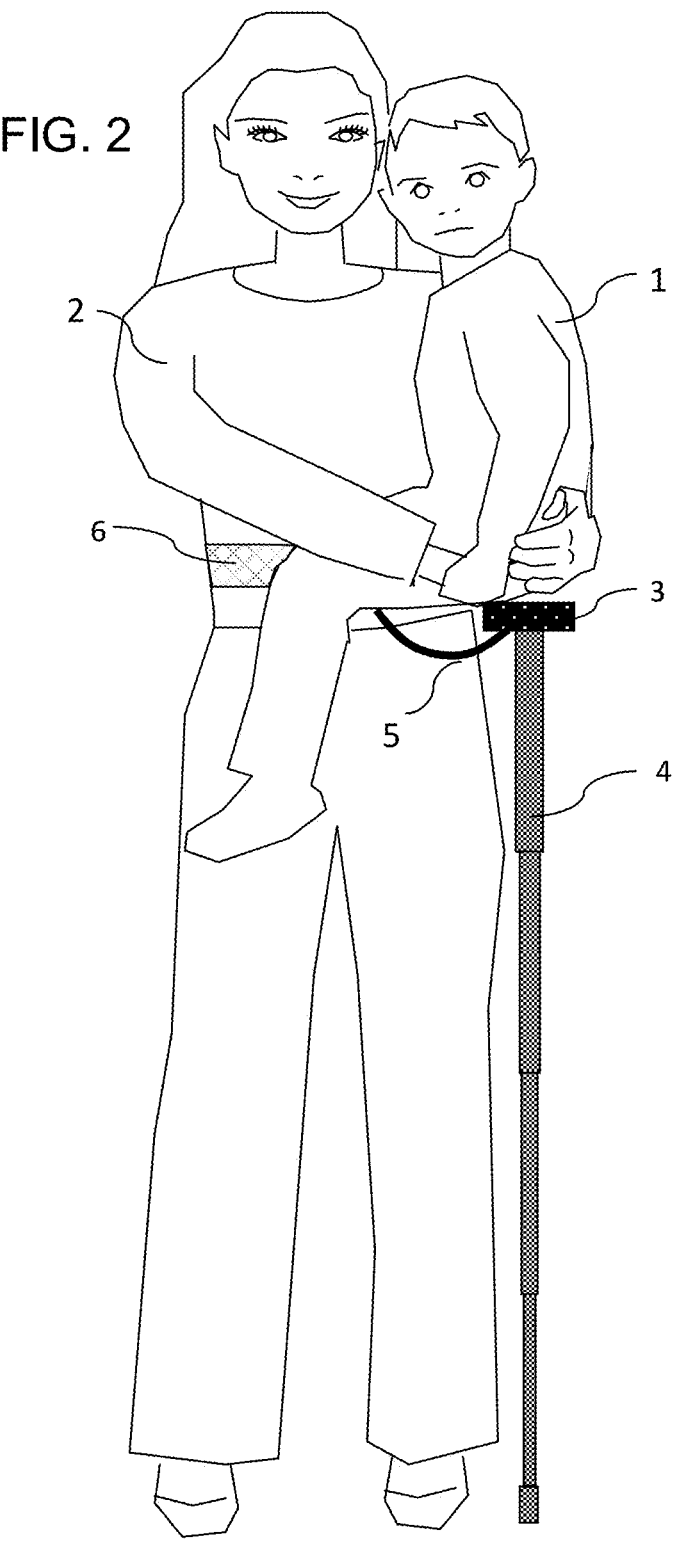
FIG. 2 illustrates the baby carrier in operation, where the adult is holding the baby on the side, the baby is sitting on the sitting element and the telescopic monopod leg is attached to the adult waistband.

FIGS. 1 and 2 illustrate a baby carrier in operation where adult 2 is holding baby 1 in front of and on the side of the body. Baby 1 is supported by detachable sitting element 3 coupled to monopod leg 4. Monopod leg attachment cable 5 is attached to adult waistband 6 worn by adult 2 to secure monopod leg 4 to adult 2 and to constrain the motion of monopod leg 4. In some implementations, monopod leg 4 is telescopic. In the discussion that follows, the carrying individual is also referred to as "adult" and the infant or child to be carried is also referred to as "baby." It should be understood that the baby carrier can be used by a teenager and the baby could be a toddler. FIGS. 3-8 illustrate an implementation of telescopic monopod leg 4 with detachable sitting element 3.

In some implementations, sitting element 3 includes mounting handle 9 (FIG. 3) having inside rotating tracks 23 (FIG. 6), that mate with rotating tracks of monopod leg mounting head 10 (FIG. 7), thus securely attaching sitting element 3 to monopod leg 4. In other implementations, sitting element 3 can be attached to monopod leg 4 using a locking mechanism (See FIG. 5) or with a bolt assembly. Sitting element 3 includes a comfortable contoured seating profile with hills 21 and valleys 22 (FIG. 6). The sitting element 3 can optionally include a seatbelt, padding and a compartment for holding food or a bottle. Attachment ring 8 couples monopod attachment cable 5 to the side of monopod leg 4. In some implementations, the width of the sitting area of sitting element 3 can be mechanically adjusted using levers or other mechanisms. In some implementations, sitting element can have an extended portion that is perpendicular to the sitting area to provide a back support for the baby. In some implementations, the sitting element may be semi rigid or solid, which will mostly not deviate in its shape when sat upon by the baby. In some implementations, the sitting element with an extended back portion may be semi rigid or solid, which will mostly not deviate in its shape when sat upon by the baby and will disperse the weight of the baby across at least a portion of the sitting element.

FIG. 4 is a front view of monopod leg 4 in a compact profile showing primary and secondary height control buttons 11, 13 for coarse and fine height adjustment of sitting element 3 and mounting head 10. FIG. 5 is a front view of monopod leg 4 in an extended profile, showing sitting element 3 mounted on the top of monopod leg 4.

Due to the varying adult heights and the variety of baby holding and carrying positions, the ideal height of sitting element 3 from ground can have a wide range. The baby carrier includes dual height adjustment controls: a coarse and a fine height adjustment controlled by button 13 and button 11. Element 12 connects the coarse range segment (below element 12) and fine range segment (above element 12). The coarse control sets monopod leg 4 to a preferred height range, usually determined by the height of the carrying adult. The fine control finely tunes the height of sitting element 3 for different holding positions. Button 11, being close to sitting element 3 is easily accessible by the carrying adult.

Referring to FIG. 5, the coarse range segment includes top section 18, mid-section 20 and base section 14. Button 13, together with locking node 46, controls the length of the coarse range segment. When pushing control button 13, top section 18 and mid-section 20 can be extended as shown in FIG. 5. Locking node 46 locks to different node positions, such as node position 19 of top section 18, upon button 13 being released. At the same time mid-section 20 extends its length. In a fully extended configuration, top section 18, mid-section 20 and base section 14 have about the same length. Button 11, with locking node 45, controls the length of the fine range segment. When pushing control button 11, fine range section 16 can be extended. The locking node 45 locks to different node positions, such as node position 17 of fine range segment extension section 16, upon button 11 being released. In some implementations, non-skid base tip 15 adds stability to the baby carrier. It also acts as an anchor tip when adult holds baby in a swing mode.

FIG. 8 shows an implementation of an optional roller wheel 24 attached to the tip of monopod leg 4. Roller wheel 24 can be used to move the baby carrier around. In some implementations, roller wheel 24 can be retracted or stopped (e.g., by a foot brake) when the baby carrier is stationary. In the example shown, extension and retraction controls 47 and 48 (e.g., push buttons) control the extension and retraction of roller wheel 24. In some implementations, monopod leg 4 includes a non-sink cover tip (not shown) that is flanged or otherwise configured to prevent the tip of monopod leg 4 from sinking into a soft walking surface (e.g., mud).

In some implementations, base section 14 of monopod leg 4 can include retractable or fold out support legs (not shown) that can be deployed by the foot of adult 2 using a mechanical lever protruding from base section 14 (not shown) or other suitable deployment mechanism. The support legs can provide additional stability for sitting element 3 when the adult is standing stationary for a long period of time, thus reducing the stress on the waist of adult 2.

Figure 10:
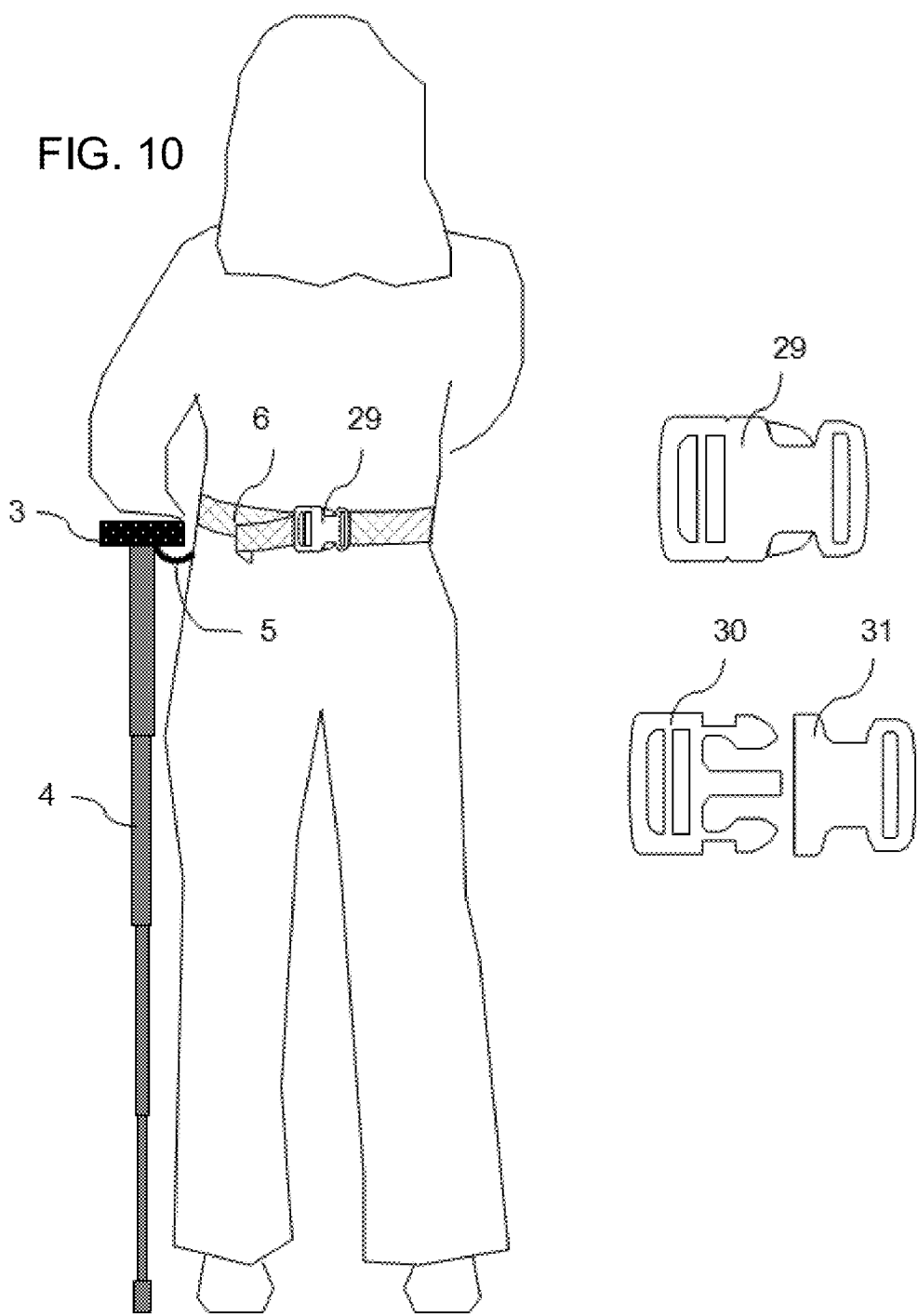
FIG. 10 is a back view of the baby carrier with the adult waistband on an adult and a detailed view of a waistband adjustment buckle.

FIG. 9 is a front view of the baby carrier with the adult waistband on an adult and a detailed view of the monopod leg cable attached to the adult waistband. FIG. 9 shows one implementation of attaching monopod leg 4 to adult 2 via monopod leg cable 5 to adult waistband 6. Element 26 (D-ring, O-ring) is fixed onto adult waistband 6 with stitches 27 or other known attachment mechanism (e.g., rivets). Clip 28 clips to element 26. Adult waistband 6 can be put on and off easily with adjustable buckle 29 having mating part 30 and adjustable fastener 31, as illustrated in FIG. 10.

Figure 11:
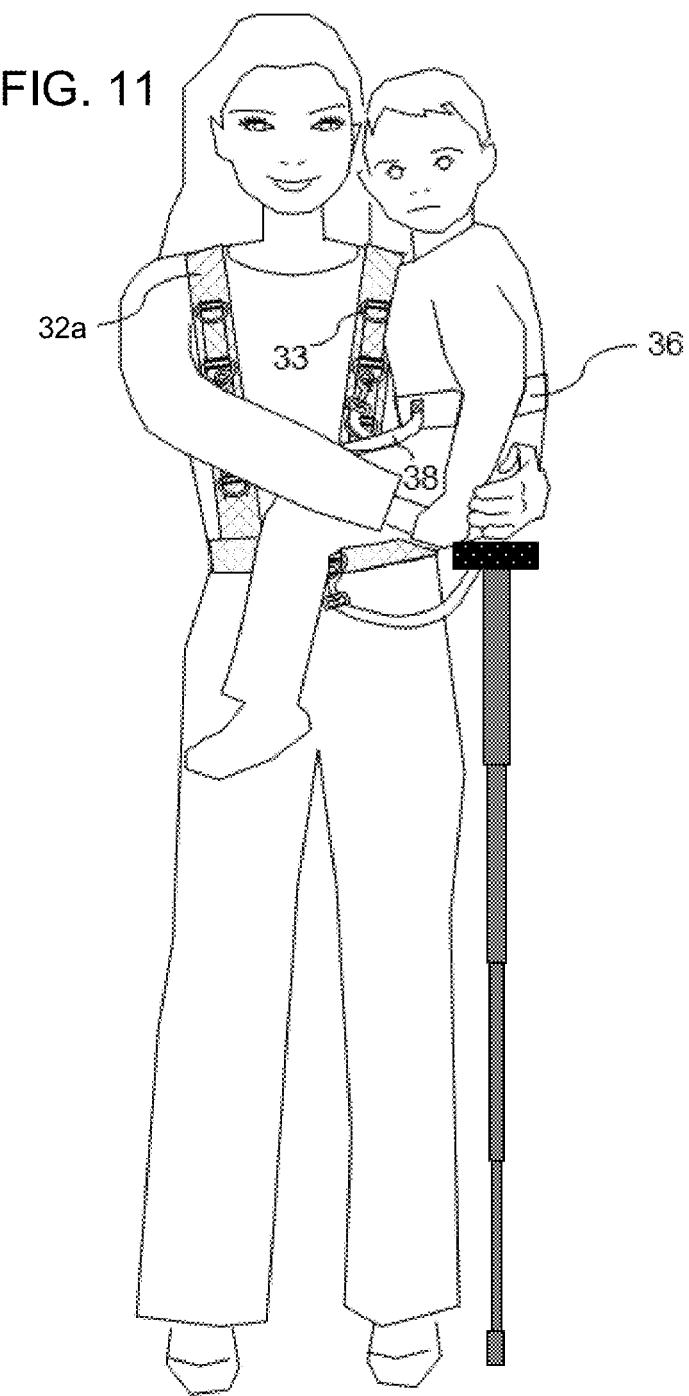
FIG. 11 illustrates the baby carrier in operation where an adult is holding a baby on the side, the baby is sitting on the sitting element, the telescopic monopod leg is attached to the adult waistband and the baby is wearing a baby waistband that is attached to an adult shoulder strap.
Figure 13:
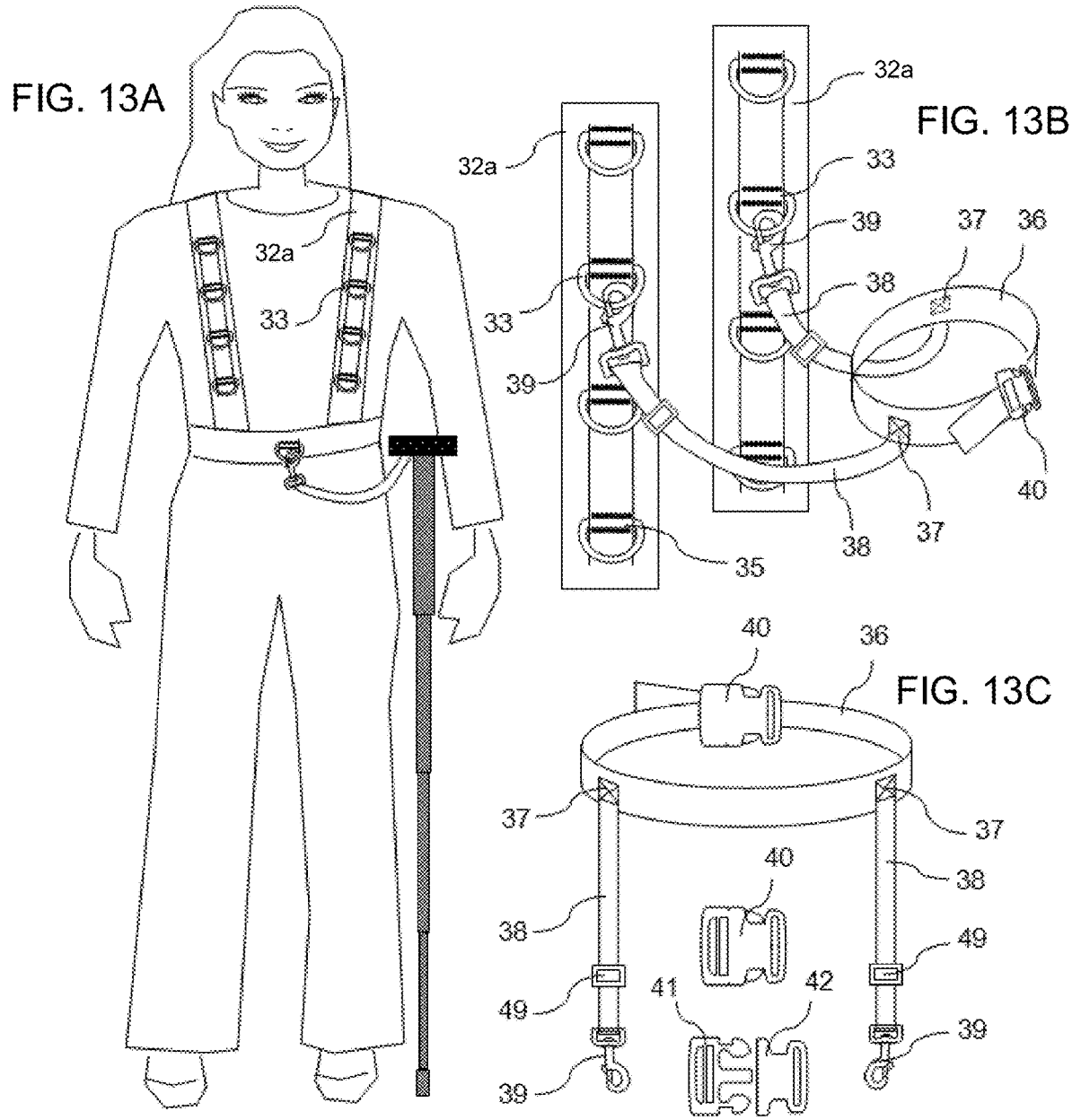
FIGS. 13A-13C illustrate the adult shoulder strap with front strap attachments and a baby waistband.

FIG. 11 illustrates the baby carrier in operation where an adult is holding a baby on the side, the baby is sitting on the sitting element, the telescopic monopod leg is attached to the adult waistband and the baby is wearing baby waistband 36 that is attached to adult shoulder straps 32 with attachment cable 38. Shoulder straps 32 include attachments 33, as shown in more detail in FIG. 13.

Figure 12:
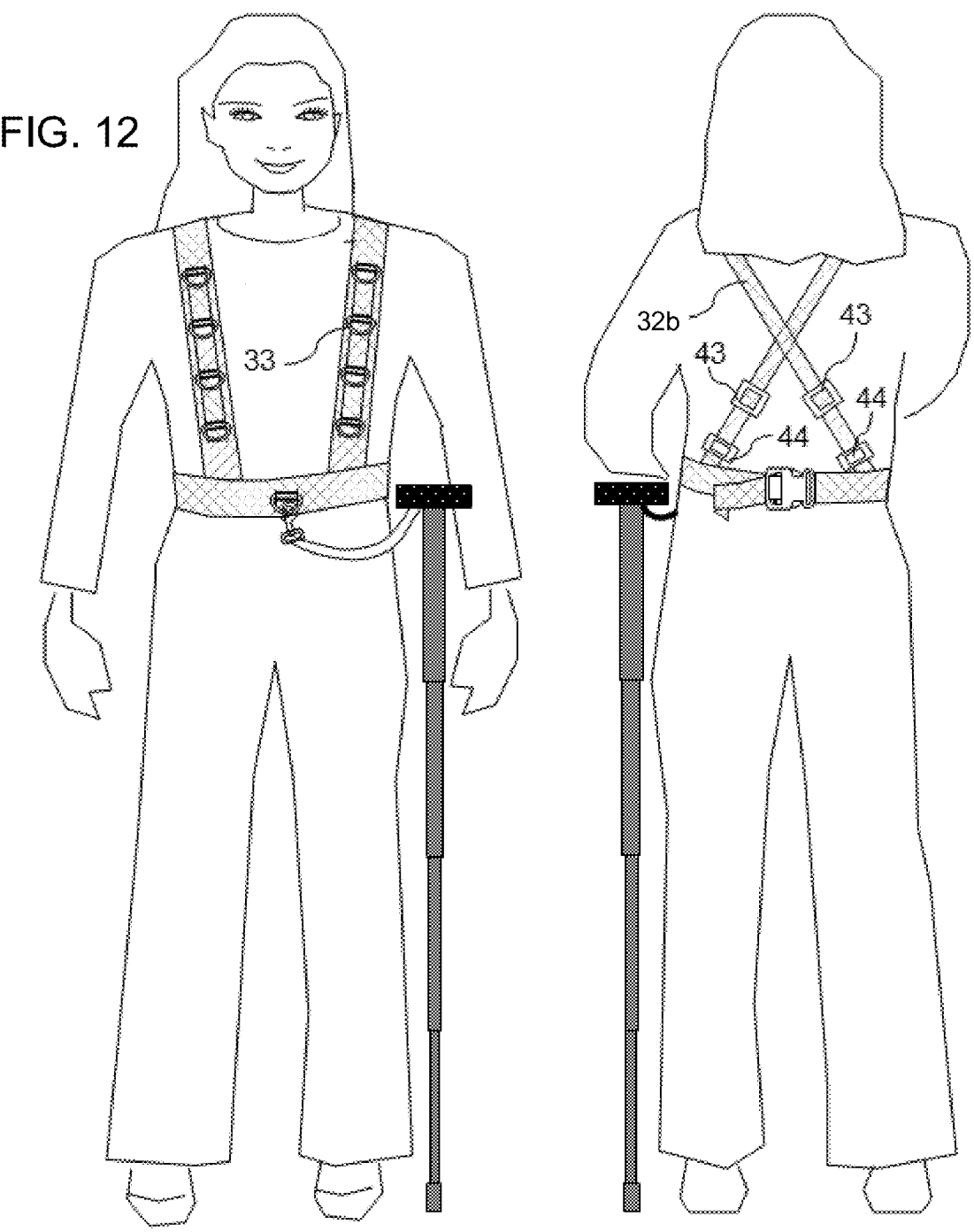
FIG. 12 illustrates the front and back view of the adult shoulder strap worn on an adult.

FIG. 12 shows the adult shoulder strap front portion 32a and back portion 32b. Front portion 32a, with a left piece and a right piece, extends up from the waistband to the shoulder. The left and right pieces then pass the adult shoulders and extend downward, cross over and end at the adult waistband 6 on the back. Front portion 32a is usually wider, with attachments 33 for attachment cable 38 to clip on. The lengths of shoulder straps 32 are adjustable, supported by back portion loop around elements 44 and length adjustment elements 43.

FIGS. 13A-13C illustrate adult shoulder straps 32 with attachments 33 and baby waistband 36. Baby waistband 36 is easily put on and off with clips 39. Buckle 40 with mating part 41 and 42, incorporates a built-in fastener 41 to adjust the length of baby waistband 36. Attachment cables 38 attach baby waistband 36 at attachments 37 and use clips 39 to attach to attachments 33 of adult front shoulder straps 32. The length of attachment cables 38 can be adjusted with elements 49.

Figures 14, 15:
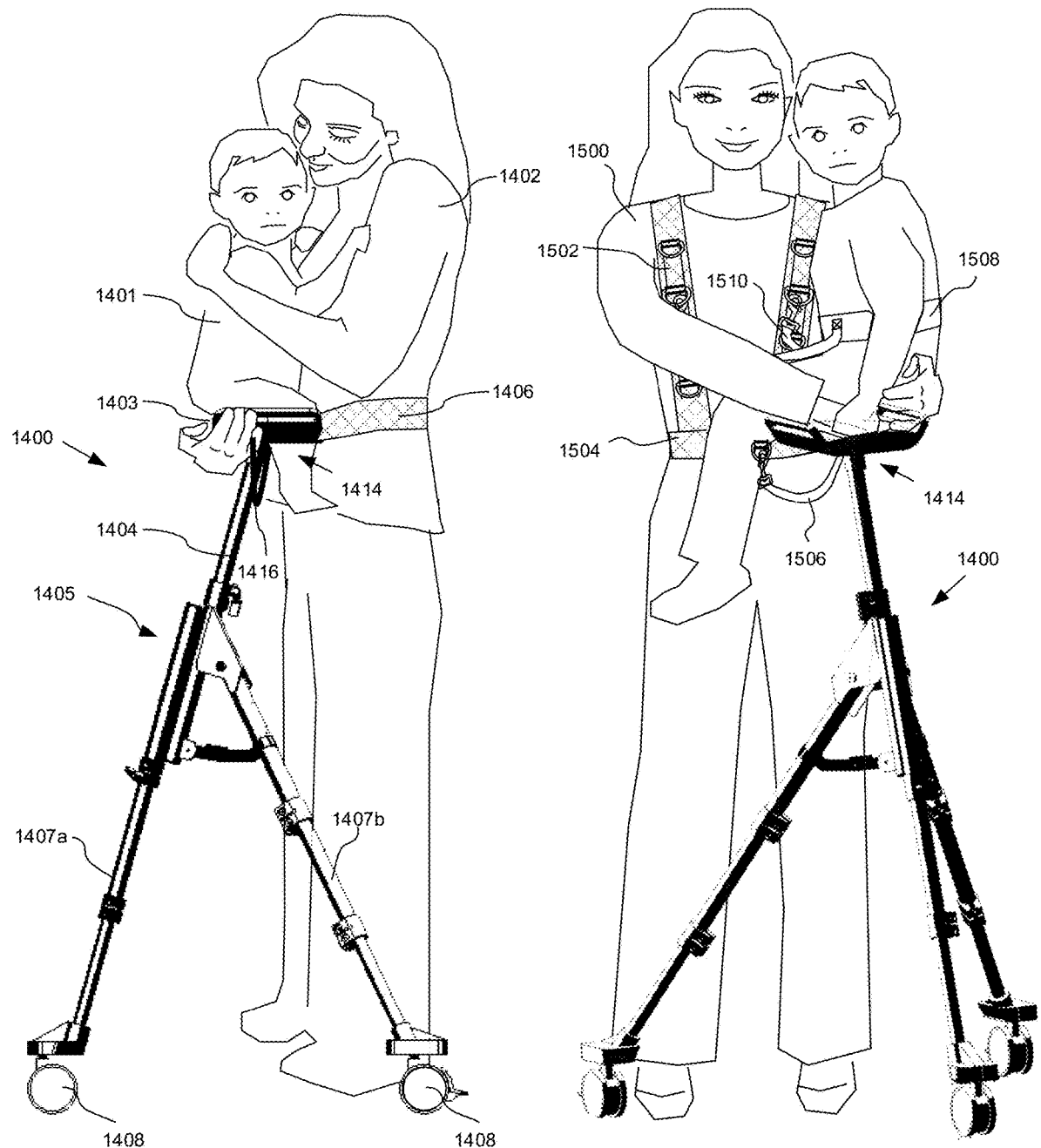
FIG. 14 illustrates another example baby carrier in operation where an adult is holding a baby in the front of the adult's body and the baby is sitting on the baby carrier.
FIG. 15 illustrates the baby carrier of FIG. 14 in operation, where the adult is holding the baby on the side of the adult's body and the baby is sitting on the baby carrier.

FIG. 14 illustrates another example baby carrier 1400. In this example, the baby carrier 1400 includes a sitting element 1403 secured to a monopod 1404. The monopod 1404, in turn, is secured to a wheeled support frame 1405. The coupling between sitting element 1403 and support monopod 1404, and further coupling to the support frame 1405 can all rigid (e.g., to allow firm weight support from the floor and/or to provide a sitting element 1403 and the support monopod 1404 as a fixed unit). As shown in FIG. 14, during operation of the baby carrier 1400, a carrying individual 1402 (e.g., an adult) can deploy the baby carrier 1400 such that the support frame 1405 contacts a firm surface (e.g., the floor). Further, the carrying individual 1402 can hold a baby or toddler 1401 in the front of her body, and position the baby or toddler 1401 such that the baby or toddler 1401 is positioned on the sitting element 1403. This can be useful, for example, as it enables the carrying individual 1402 to support and/or transport the baby or toddler 1401 more easily (e.g., as some or all of the weight of the baby or toddler is supported by the baby carrier 1400 instead of by the carrying individual 1402). In some cases, the baby carrier 1400 can be configured such substantially the entire weight of the baby toddler 1401 is supported by the baby carrier 1400 during use.

In some implementations, the monopod 1404 and/or the wheeled support frame 1405 are telescopic. For example, in some implementations, the monopod 1404 is telescopic, can be extend outward from the wheeled support frame 1405, or retract into the wheeled support frame 1405. As another example, one or more of the legs 1407a-c of the wheeled support frame can be telescopic, and can be extended or retracted. This can be useful, for example, as it enables the carrying individual 1402 to adjust the dimensions of the baby carrier 1400 to suit her physical dimensions. For example, a taller carrying individual 1402 can extend the monopod 1404 and/or the wheeled support frame 1405, such that the sitting element 1403 is positioned higher (e.g., in a "carrying" or "deployed" position near the carrying individual's waist, such that the carrying individual can comfortably place the baby or toddler 1401 onto the sitting element 1403 while securely grasping the baby or toddler 1401 such that he does not fall). Likewise, a shorter carrying individual 1402 can retract the monopod 1404 and/or the wheeled support frame 1405 to a different position to account for the difference in her height.

In some implementations, wheeled support frame 1405 can be a tripod frame or quad frame. For example, as shown in FIG. 14, the wheeled support frame 1405 can include three legs 1407a-c, each with a corresponding wheel 1408 mounted to its end. Wheels 1408 can include brakes to enhance mobility and stability. In some implementations, legs 1407a-c of wheeled support frame 1405 are rotatably coupled to monopod 1404 (e.g., through a hinge joint) to allow a user to fold-in legs 1407a-c so legs 1407a-c are in alignment with monopod 1404 (e.g., parallel or substantially parallel), which can facilitate carrying and storage of the baby carrier (e.g., in a "stowed" position).

In some cases, the baby carrier 1400 can include a harness that secures the baby carrier 1400 to the carrying individual 1402. As a notation, throughout the document, harness is used to describe the semi-rigid or flexible wearable parts with necessary connectors worn by either adult or the baby or toddler, as an essential component of the baby carrier. The portion worn by the adult is referred to as "adult harness".

The portion worn by the baby is referred to as "baby harness". In some cases, harness takes the form of soft straps, bands or belts, pouches, cables and clips. In some cases, harness takes the form of semi-rigid wearables of certain shapes designed around the body. As an example, as shown in FIG. 14, the baby carrier 1400 can include a harness 1406 that is similar to that shown in FIG. 1. For instance, the harness 1406 can include a waistband that is configured to encircle the carrying individual's waist during use of the baby carrier 1400. The baby carrier 1400 can be attached to the harness through a cord 1416 (e.g., a cord extending between the waistband to the sitting element 1403, monopod 1404, and/or wheeled support frame 1405). In some cases, the harness 1406 can be configured such that it only encircles the carrying individual during use (and not the baby or toddler 1401). This can be useful, for example, as it enables the carrying individual 1402 to carry and reposition the baby or toddler 1401 more easily, and with fewer encumbrances. In some cases, the harness 1600 can include one or more "non-slip" surfaces (e.g., rubber, foam, and/or patterned surfaces) that increase the friction between the harness 1600 can the carrying individual, such that the harness 1600 is less likely to slip off of the carrying individual during use.

As another example, the baby carrier 1400 can include a harness 1500 similar to that shown in FIG. 11. For instance, as shown in FIG. 15, the harness 1500 can include one or more shoulder straps 1502 that are configured to loop around the carrying individual's shoulders, and an adult waistband 1504 that encircles the carrying individual's waist. The baby carrier 1400 can be attached to the harness 1500 through a cord 1506 (e.g., a cord extending between the shoulder straps 1502 and/or waistband 1504 to the sitting element 1403, monopod 1404, and/or wheeled support frame 1405).

In some cases, a harness also can be configured to secure the baby or toddler 1401 to the carrying individual 1402. For example, as shown in FIG. 15, the harness 1500 can include a baby harness 1508. The baby harness 1508 is configured to attach to the baby or toddler 1401 during use of the baby carrier 1400 (e.g., through a baby waistband configured to encircle the baby or toddler's waist). The baby harness 1508 can be secured to the rest of the harness 1500 through a cord 1510 that extends between the shoulder straps and/or adult waistband to the baby waistband. To enhance safety and control, the harness assembly can form a semi-rigid coupling between baby and adult, which enables the baby to stay within a particular distance (e.g., an arm's length) away from the adult at all time. This also can be useful, for example, as it enables the harness 1500 and the carrying individual 1402 to support the baby or toddler 1401 in the event that the baby or toddler 1401 is accidentally dropped. Further, in some cases, proximity between the seating assembly and the carrying adult can be enabled through support links formed between the seat assembly and the attachment harness. For example, Velcro patches maybe installed on the seat to form connection to baby harness.

Figures 16, 17:
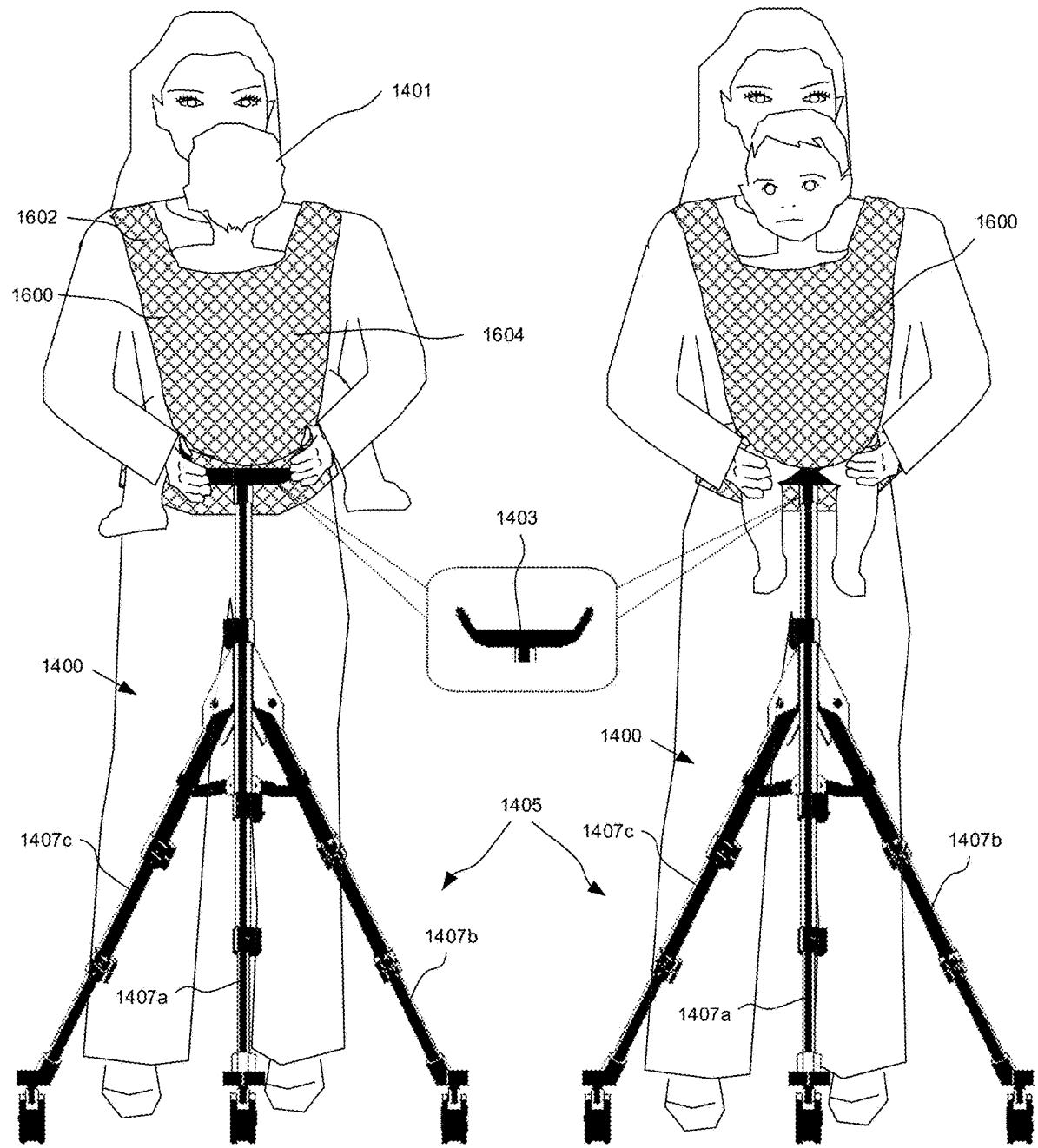
FIG. 16 is a front view of the baby carrier of FIG. 14 used together with a strap-on baby carrier when baby is sitting facing the adult. The baby in the strap-on baby carrier is sitting on the seat supported by a wheeled tripod frame.
FIG. 17 is a front view of the baby carrier of the baby carrier of FIG. 14 used together with a strap-on baby carrier when baby is forward facing. Baby in the strap-on baby carrier is sitting on the seat supported by the wheeled tripod frame.

In some cases, a harness can have a pouch-like configuration. For example, as shown in FIG. 16, a harness 1600 can include two shoulder straps 1602 extending from a central portion 1604 and a waist band around the adult waist. The harness 1600 is configured such that during use, the shoulder straps 1602 loop around the carrying individual's shoulders, and the central portion 1604 is positioned on the torso of the carrying individual 1402, forming a supportive pouch. The carrying individual 1402 can place the baby or toddler 1401 into the pouch (e.g., between the central portion 1604 and her torso), such that the baby or toddler 1401 is secured to the carrying individual's body. As shown in FIG. 16, the baby or toddler 1401 can be positioned such that he faces towards the carrying individual 1402. As shown in FIG. 17, the baby or toddler 1401 also can be positioned such that the faces away from the carrying individual 1402. In some cases, the harness 1600 can be formed from a flexible, compliant, and/or soft material (e.g., cloth, rubber, silicone, plastic, or any other material), such that it can be readily conform to the dimensions of the carrying individual and the baby or toddler 1401.

In some cases, the baby carrier 1400 can be configured such that the weight of the baby or toddler 1401 is distributed between the baby carrier 1400 and the carrying individual's shoulders during some or all aspects of use. For example, as shown in FIGS. 16 and 17, the baby carrier 1400 can be configured such the sitting element 1403 is adjustable to approximately the height of the carrying individual's waist, or a particular distance higher than the height of the carrying individual waist (e.g., approximately one inch above the height of the carrying individual's waist, or some other distance). Further, the harness 1600 can be configured such that when the baby or toddler 1401 is placed within it, the baby or toddler 1401 is positioned at approximately the height of the carrying individuals' waist. This enables the carrying individual to comfortably place the bottom of the baby or toddler 1401 onto the sitting element 1403.

Figure 18:
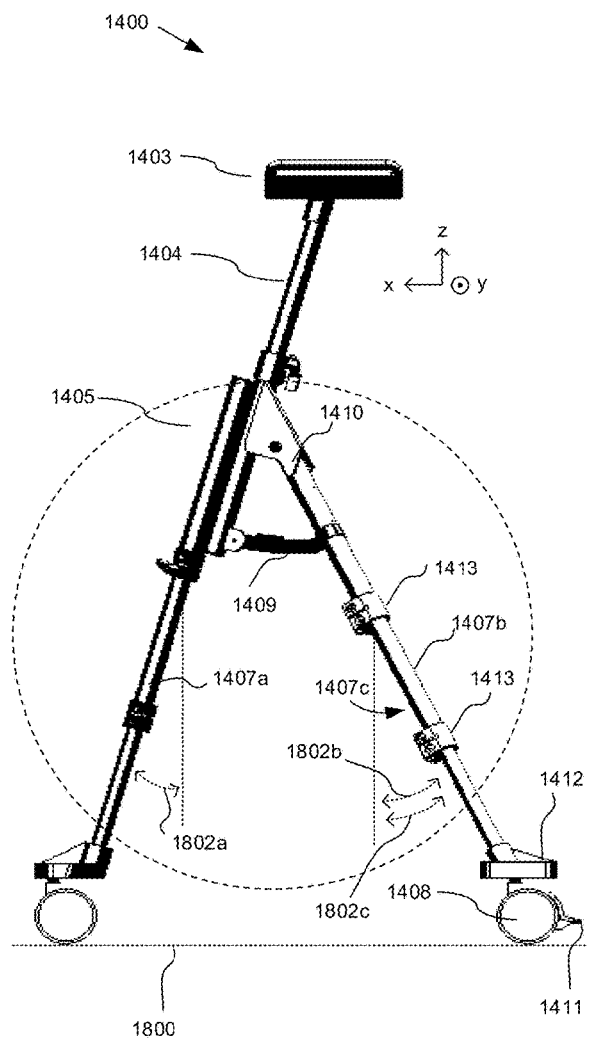
FIGS. 18 and 19 show side and front views, respectively, of the baby carrier of FIG. 14.

In some cases, the coupling between the sitting element, together with its support link, and the attachment harness can be semi-rigid, which enables the sitting element to have at least four of the six degrees of freedom of adjustment (e.g., linear translation with respect to the x-, y-, and z-axes, as well as rotation about those axes, such as pitch, yaw, and roll). In some cases, we can adopt the coordinate definition convention for aircraft or sea vehicles, and can define the six degrees of freedom representing the motion and capability of the seating assembly, as well as the directions and angles as follows:

The x-axis can refer to the linear direction representing forward and backward motion (e.g., in FIG. 18, in the left direction and in the right direction, respectively).

The y-axis can refer to the linear direction representing sideway motion left and right, which is the horizontal axis orthogonal to the x coordinate (e.g., in FIG. 18, out of the page and into the page, respectively).

The z-axis can refer to the linear direction representing vertical motion up and down, which is the vertical axis orthogonal to the x coordinate (e.g., in FIG. 18, in the upward direction and in the downward direction, respectively).

The pitch direction can represent the rotational direction to tilt forward and backward (e.g., rotation about the y-axis). The pitch angle can also represent the angle between the extension of the leg and the vertical direction, indicating the incline of the leg from the vertical direction along the x-z plane.

The yaw direction can represent the rotational direction to rotate left and right in horizontal plane (e.g., rotation about the z-axis).

The roll direction can represent the rotational direction to tilt left and right (e.g., rotation about the x-axis). The roll angle can also represent the angle between the extension of the leg and the vertical direction, indicating the incline of the leg from the vertical direction along the y-z plane.

When deployed, the seating assembly can have a semi-rigid attachment to the attachment harness with the six degrees of freedom in adjustments. In some case, the rigidity of the seating assembly with respect to the attachment harness can be less with respect to one or more directions (e.g., the y-axis) than one or more other directions (e.g., the x-axis or z-axis). Further, in some cases, the rigidity of the seating assembly with respect to the attachment harness can be less in one or more axes of rotation (e.g., the pitch direction) than one or more other directions (e.g., the yaw or roll directions).

In some case, the support frame assembly can readjust the harness and raise the seating assembly by a non-trivial amount (e.g., half inch or more) above the position that the adult might otherwise carry a baby or toddler, if not for the baby carrier (e.g., a "rest position" at which the user typically carries the baby without the assistance of the baby carrier). Thus, the baby carrier can provide substantial weight support to the baby or toddler from the floor surface, reducing the carrying load to the carrying adult by a non-trivial amount, (e.g., at least 50% or at least 75%).

In some cases, the support frame assembly raises the seating assembly by an amount that readjusts the support links, while sustaining the position of the attachment harness on the adult, such that the leg support frame supports more of the baby with seating assembly carry weight, than the adult through the adult with the adult attached harness above the comparable rest position of those without using the support frame (when decoupled from the baby carrier), thus providing substantial weight support to the baby or toddler from the floor surface, thereby reducing the weight strain placed on the harness attached to the adult. That is, when in the deployed state, the weight carried by the leg support frame being greater than the weight being carried by the adult. In some cases, when the support frame assembly raises the seating assembly, the support links allow the positional relationship between the seating assembly and the harness to change, primarily in the z direction and minimally in the X and y directions, thereby raising the seating assembly in relation to the harness attached to the adult.

Further, although the baby or toddler 1401 is sitting on the sitting element 1403, at least some of the weight of the baby or toddler 1401 is supported by the harness 1600 (and in turn, by the carrying individuals' shoulders). This can be useful, for example, as it enables the carrying individual to support the baby or toddler 1401 more easily (as the baby or toddler's weight is distributed between the sitting element 1403 and her shoulders). This also can be useful, for example, as it enables the carrying individual to maintain control over the baby or toddler 1401 (e.g., while the baby carrier 1400 is being moved). In some cases, in this configuration, the sitting element 1403 can support between 1 to 99% of the baby or toddler's weight (e.g., 10%, 20%, 30%, 40%, 50%, 60%, 70%, 80%, 90%, or some other percentage). In some cases, in this configuration, the carrying individual's shoulders can support between 1 to 99% of the baby or toddler's weight (e.g., 10%, 20%, 30%, 40%, 50%, 60%, 70%, 80%, 90%, or some other percentage). In practice, this distribution can be modified to suit each particular application. Further, in some cases, the baby carrier 1400 can be adjusted to position the baby or toddler at different heights with respect to the carrying individual (e.g., at the carrying individual's waist or chest, or at any other height).

Further, in some cases, the baby carrier 1400 can be configured such that the entire weight of the baby or toddler is 1401 is supported by the baby carrier 1400 during some or all aspects of use. For example, the baby carrier 1400 can be configured such that it supports the entire weight of the baby or toddler 1401 when the baby carrier 1400 is stationary. This can be useful, for example, in alleviating the carrying individual's burden of carrying the baby or toddler 1401.

Although example harnesses are shown in FIGS. 14-17, these are merely illustrative examples. Other harnesses are also possible. For example, in some cases, a harness can include a baby harness having shoulder straps and a waistband configured to fit a baby or toddler 1401 during use. This can be beneficial, for example, as it enables the baby or toddler 1401 to be more securely attached to the carrying individual 1402 during use of the baby carrier 1400.

Figure 19:
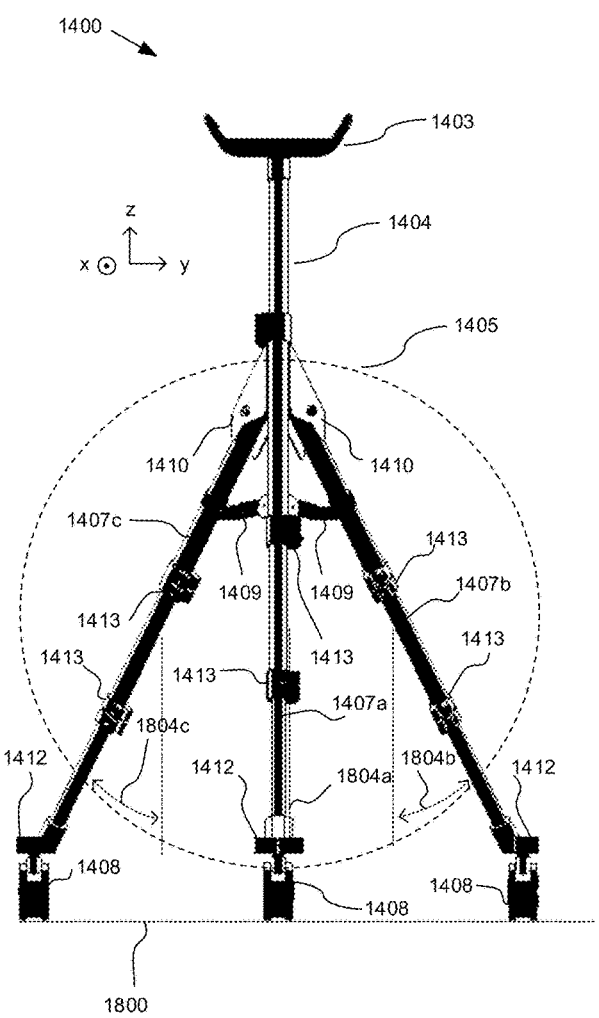

FIGS. 18 and 19 show side and front views of the sitting element and monopod, as well as the support frame of the baby carrier of FIG. 14 without the attachment harness and corresponding support links. As shown in FIG. 14, the sitting element 1403 is rigidly attached to monopod coupled to wheel 1404, which is coupled with the wheeled support frame 1405 equipped with wheels 1408. This rigidity enables firm weight support of the baby through the support frame the ground, thus providing substantial carrying load reduction to the adult. Legs 1407a-c of wheeled support frame 1405 are rotatably coupled to monopod 104 by hinged mounting bracket 1410 and hinged support links 1409. Adjusting blocks 1413 are used to telescopically adjust legs 1407a-c. Wheel support bases 1412 include angled receivers for receiving ends of legs 1407a-c.

In some cases, the sitting element 1403 can be rigidly coupled to the support frame 1405. This can be useful, for example, as it enables the sitting element 1403 and support frame 1405 to securely and stably support the weight of the baby or toddler 1401 (e.g., such that the sitting element 1403 does not move relative to the support frame 1405 when a baby or toddler 1401 is placed upon it). In some cases, the sitting element 1403 can be rigidly coupled to the support frame 1405 in a reversible manner (e.g., through a telescoping mechanism and a locking adjusting block) so that the sitting element 1403 can be adjusted as needed, then locked to support the weight of the baby or toddler 1401.

In some cases, the position and/or orientation of the sitting element 1403 can be adjusted. For example, as noted above, the sitting element 1403 can be rigidly coupled to the support frame 1405 in a reversible manner, such that the sitting element 1403 can be adjusted as needed (e.g., extended from the support frame 1405 or retracted into the support frame 1405), then locked to support the weight of the baby or toddler 1401. As another example, the sitting element 1403 can be rotated or tilted with respect to one or more axes or directions (e.g., with respect to the x-axis, y-axis, and/or z-axis, or any other axes). In some cases, the sitting element 1403 can be "pitched," "yawed," and/or "rolled" with respect to three different axes.

In some cases, the sitting element 1403 can be semi-rigidly coupled to the support frame 1405 through a suspension system 1414 (e.g., a suspension system having one or more springs, dampers, or other shock-absorbing mechanisms) to reduce the transfer of forces from the support frame 1405 to the sitting element 1403 (e.g., shocks due to movement of the baby carrier 1400 along the ground). In some cases, the suspension system 1414 can provide varying amounts of shock absorption or rigidity with respect to different axes or directions. For example, in some cases, the suspension system can provide relatively less rigidity with respect to rotation of the sitting element 1403 in the x-axis (e.g., "pitch") and relatively more rigidity with respect to rotation of the sitting element 1403 in the y and z axes (e.g., "yaw" and "roll"). This may be useful, for example, as it provides shock protection for the baby or toddler, while also reducing the likelihood that the baby or toddler will become mis-centered (e.g., swiveled left or right away from the carrying individual).

In some cases, the sitting element 1403 can include a shock absorbent material. For example, the sitting element 1403 can include a seat or cushion constructed from a compliant, elastic, and/or flexible material (e.g., cloth, rubber, silicone, foam, or other material). This can be useful, for example, in improving the comfort of the baby or toddler 1401 during use (e.g., by reducing shock when the baby carrier 1400 is being moved). In some cases, shock absorption can be provided through a shock damping mechanism in the support leg assembly. In some cases, the shock absorption mechanism can be provided via a shock damping mechanism in the junction between the support leg assembly and the seat assembly. In some cases, the shock absorption mechanism can be provided between the seat and the baby.

As shown in FIGS. 18 and 19, when the baby carrier 1400 is deployed, the ends of legs 1407a-c (e.g., the wheels 1408) are each positioned onto a common x-y plane 1800. This plane 1800 can represent, for example, a floor or ground surface upon which the baby carrier 1400 rests during use. FIG. 18 shows a side view of the baby carrier 1400 without the attachment harness, where the y-axis extends out of the page (representing the left and right directions of the baby carrier), the x-axis extends in a right to left direction on the page (representing the forward and backward directions of the baby carrier, and the forward and backward walking directions of an adult operating the baby carrier), and the z-axis extends in a bottom to top direction. FIG. 19 shows a front view of the baby carrier 1400, where the x-axis extends in a right to left direction, the y-axis extends in outward from the page, and the z-axis extends in a bottom to top direction.

Further, each of the legs 1407a-c is inclined with respect to the plane 1800 and/or the z-axis. For example, as shown in FIG. 18, a first leg 1407a is inclined with respect to the z-axis along the x-z plane by a first pitch angle 1802a, a second leg 1407b is inclined respect to the z-axis along the x-z plane by a second pitch angle 1802b, and a third leg 1407c (positioned behind leg 1407b in FIG. 18) is inclined with respect to the z-axis along the x-z plane by a third pitch angle 1802c.

Further, as shown in FIG. 19, the first leg 1407a is inclined with respect to the z-axis along the y-z plane by a first roll angle 1804a (shown in FIG. 19 as a zero or non-substantial incline), the second leg 1407b is inclined respect to the z-axis along the y-z plane by a second roll angle 1804b, and the third leg 1407c is inclined with respect to the z-axis along the y-z plane by a third roll angle 1804c.

Each of the pitch angles 1802a-c and roll angles 1804a-c can vary, depending on the implementation. Further, the lengths of each of the legs 1407a-c also can vary, depending on the implementation. For example, as shown in FIGS. 18 and 19, the first pitch angle 1802a can be less than the pitch angles 1802b and 1802c. Further, the pitch angles 1802b and 1802c can be approximately the same. Further, the roll angle 1804a can be approximately 0° (i.e., leg 1407a stays in the x-z plane), and the roll angles 1804b and 1804c can be greater than 0° and be approximately the same as each other. Further still, the leg 1407a can be longer than each of the legs 1407b and 1407c, and the legs 1407b and 1407c can have approximately the same length. In this asymmetrical configuration, the sitting element 1403 is positioned nearer to the rear of the baby carrier 1400 (e.g., nearer the right side of the baby carrier 1400 in FIG. 18, and further into the page in FIG. 19). This can be useful, for example, as it positions the sitting element 1403 closer to the carrying individual 1402 during use of the baby carrier 1400, such that she can position the baby or toddler 1401 more securely and closer to her body.

In practice, the pitch angles 1802a-c and roll angles 1804a-c can vary, depending on the implementation. For example, when the baby carrier is in a deployed position (e.g., when the legs 1407a-c are fully rotated/folded outward from the support frame 1405), the pitch angle 1802a can be between 10° and 25° (e.g., 16°), the pitch angle 1802b can be between 15° and 30° (e.g., 23°), and the pitch angle 1802c can be between 15° and 30° (e.g., 23°). Further, in some cases, the roll angle 1804a can be approximately 0°, the roll angle 1804b can be between 10° and 30° (e.g., 24.5°), and the roll angle 1804c can be between 10° and 30° (e.g., 24.5°). In some cases, these angles can be beneficial, as they enable the baby carrier to support the baby stably, and in a position that is comfortable to the adult (e.g., by providing an asymmetrical configuration that positions the baby stably and securely closer to the adult). Although example angles are described above, other angles are also possible, depending on the implementation.

Further, the lengths of each of the legs 1407a-c and monopod 1404 also can vary, depending on the implementation. For example, in some cases, the leg 1407a can have a length between 28 inches to 36 inches, the leg 1407b can have a length between 32 inches and 40 inches, the leg 1407c can have a length between 32 inches and 40 inches, the monopod 1404 can have a length between 1.5 inches and 13 inches. In some cases, the lengths of the legs can be adjusted, either within these ranges, or within some other range. In some cases, these lengths can be beneficial, as they enable the baby carrier to support the baby stably, and in a position that is comfortable to the adult. Although example lengths are described above, other lengths are also possible, depending on the implementation.

Figure 32:
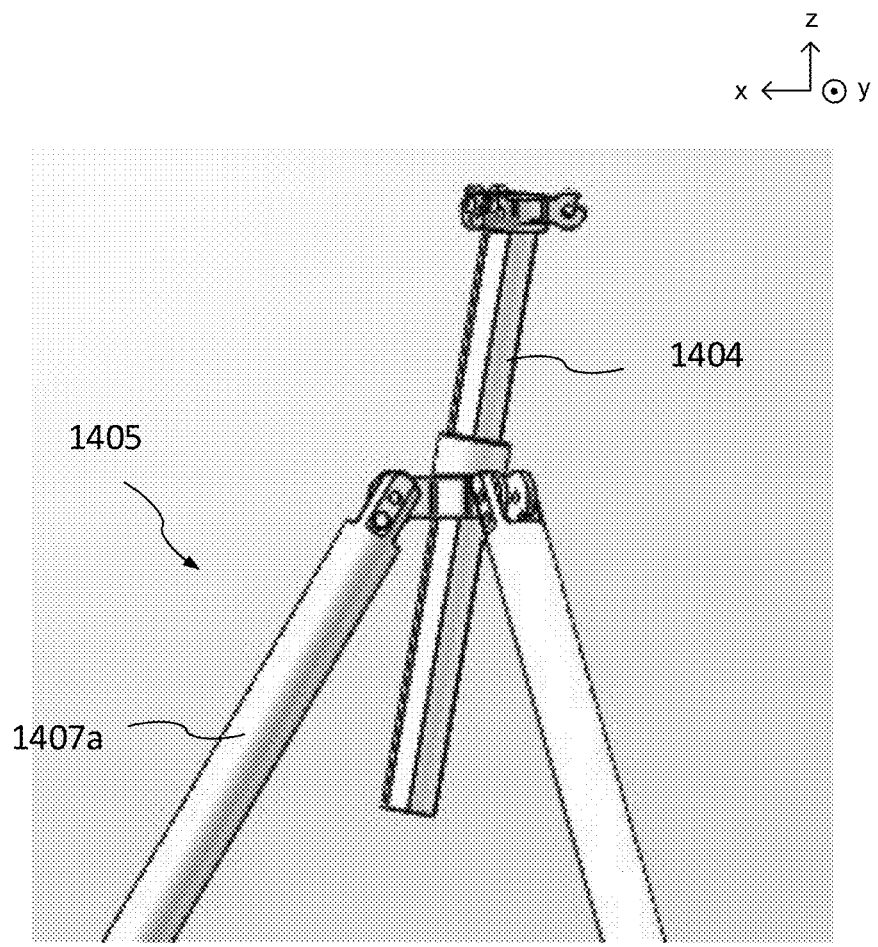
FIG. 32 shows an example asymmetrical monopod and support frame configuration.

In the example shown in FIG. 18, the monopod 1404 is parallel or substantially parallel to the leg 1407a. However, this need not be the case. In some implementations, the monopod 1404 can be skewed relative to one, some, or all of the legs 1407a-c. As an example, FIG. 32 shows an example arrange of a monopod 1404 and support frame 1405 (for ease of illustration, other components are not illustrated herein). In this example, the monopod 1404 and the leg 1407a are both aligned with the x-z plane. However, the leg 1407a is more inclined with respect to the z-axis than the monopod 1404. This results in an asymmetrical configuration in which the monopod leg extends further towards the rear of the baby carrier (e.g., further towards the right of the page). This asymmetrical configuration can be useful, for example, as it places the sitting element closer to the adult during use, and thus makes it easier for the adult to access the baby or toddler.

Although a three-legged wheeled support frame is shown in FIGS. 14-19, this is merely an illustrative example. In practice, a support frame can include any number of legs (e.g., one, two, three, four, or more legs). For instance, FIG. 18 shows a baby carrier having a physically stable structure with an asymmetric tripod frame configured for easy and secure holding of a baby. However, in some cases, a baby carrier can be configured to have a two-legged wheeled support frame, and can be configured to be securely tethered to an adult. In some cases, a baby carrier having such a configuration can be relatively more mobile, decrease the size, and/or decrease the weight of the baby carrier. In some cases, when an adult is operating a baby carrier having a two-legged support frame, the adult will provide more support in the left and right lateral direction compared to those when using a baby carrier with tripod support frame.

Figure 20:
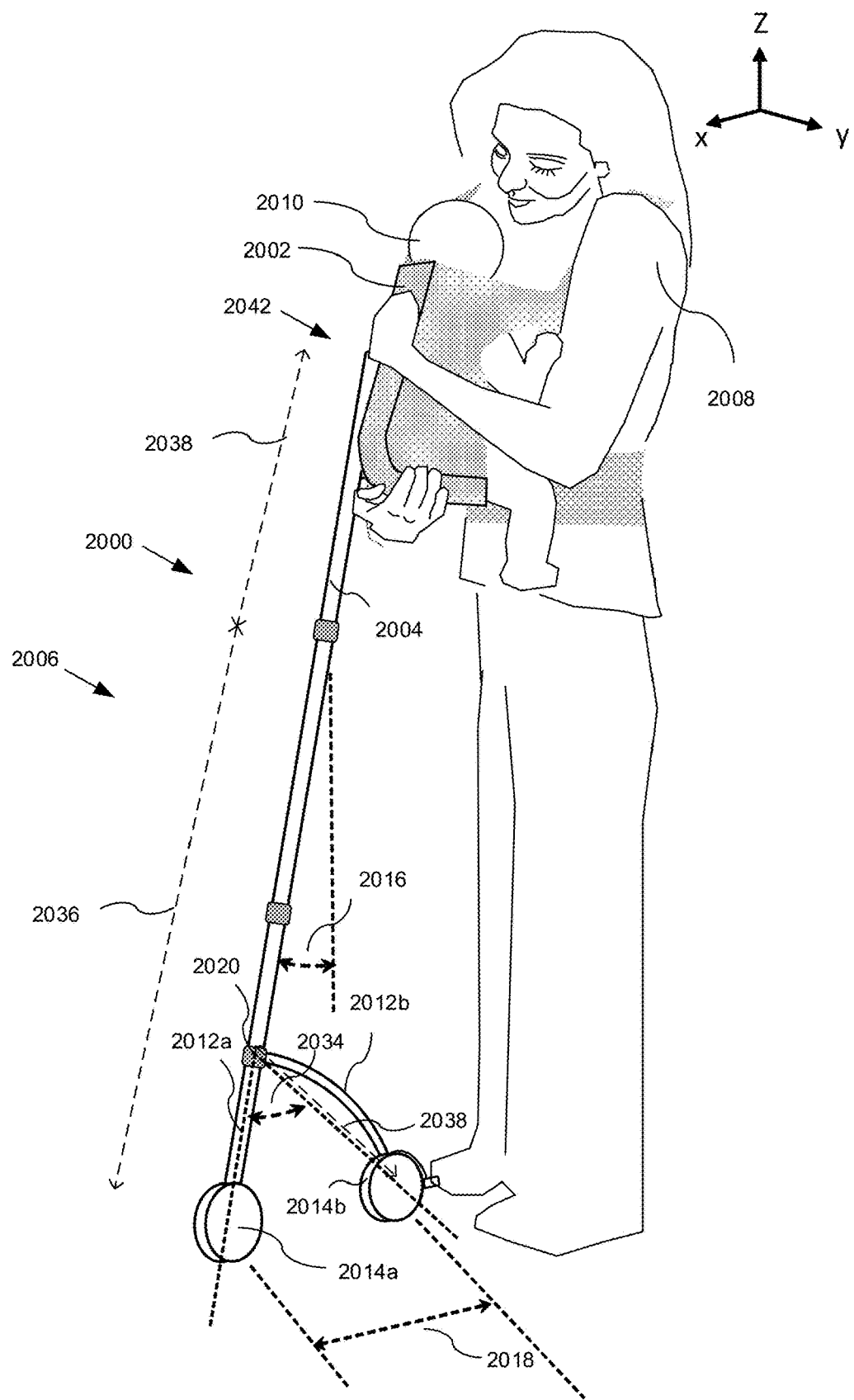
FIG. 20 shows another example baby carrier in operation where an adult is holding a baby in the front of the adult's body and the baby is sitting on the baby carrier.

As an example, FIG. 20 shows a baby carrier 2000 having a two legged structure. The baby carrier 2000 includes a sitting element 2002 secured to a monopod 2004. The monopod 2004, in turn, is secured to a two-legged wheeled support frame 2006. As shown in FIG. 20, during operation of the baby carrier 2000, a carrying individual 2008 (e.g., an adult) can position the baby carrier 2000 such that the support frame 2006 contacts a firm surface (e.g., the floor). Further, the carrying individual 2008 can hold a baby or toddler 2010 in the front of her body, and position the baby or toddler 2010 such that the baby or toddler 2010 is sitting on the sitting element 2002. In a similar manner as above, this can be useful, for example, as it enables the carrying individual 2008 to support and/or transport the baby or toddler 2010 more easily (e.g., as some or all of the weight of the baby or toddler is supported by the baby carrier 2000 instead of by the carrying individual 2008). In some cases, the baby carrier 2000 can be configured such substantially the entire weight of the baby toddler 2010 is supported by the baby carrier 2000 during use.

In some implementations, the monopod 2004 and/or the wheeled support frame 2006 are telescopic. For example, in some implementations, the monopod 2004 is telescopic, can be extend outward from the wheeled support frame 2006, or retract into the wheeled support frame 2006. As another example, portions of the wheel support frame 2006 can be telescopic, and can be extended or retracted. As above, this can be useful, for example, as it enables the carrying individual 2008 to adjust the configuration of the baby carrier 2000 to suit her physical dimensions. For example, a taller carrying individual 2008 can extend the monopod 2004 and/or the wheeled support frame 2006, such that the sitting element 2002 is positioned higher (e.g., in a "carrying" or "deployed" position near the carrying individual's waist, such that the carrying individual can comfortably place the baby or toddler 2010 onto the sitting element 2002 while securely grasping the baby or toddler 2010 such that he does not fall). Likewise, a shorter carrying individual 2008 can retract the monopod 2004 and/or the wheeled support frame 2006 to a different position to account for the difference in her height.

In the example shown in FIG. 20, the wheeled support frame 2006 includes two legs 2012a and 2012b, each with a corresponding wheel 2014a or 2014b mounted to its end. Wheels 2014a and 2014b can include brakes to enhance mobility and stability. In some implementations, legs 2012a and 2012b can be repositioned with respect to one another, such that the incline angle 2016 and the distance 2018 between the wheels of the baby carrier 2000 can be adjusted. For example, the leg 2012b can be slideably coupled to the leg 2012a (e.g., through a sliding joint or coupling 2020), such that the leg 2012b can slide up or down along the length of the leg 2012a. The leg 2012b can be slid upward along the length of the leg 2012a to increase the distance 2018, and in turn, increase the incline angle 2016. The incline angle 2016 can refer, for example, to the angle between the z-axis and the axis of extension of the monopod 2004, when the ends of the legs 2012a and 2012b (e.g., the wheels 2014a and 2014b) are positioned on a common x-y plane (where the x-axis extends from a rear of the baby carrier 2000 to the front of the baby carrier 2000, and the y-axis extends from the right side of the baby carrier 2000 to the left side of the baby carrier 2000). The leg 2012b also can be slid downward along the length of the leg 2012b to decrease the distance 2018, and in turn, decrease the incline angle 2016. This can be useful, for example, as it enables the carrying individual to customize the baby carrier 2000 so that she can carry and/or transport the baby or toddler 2010 more securely and/or more comfortably.

In some cases, the distance 2018 can be relatively short (e.g., less than two feet, less than one foot, etc.) Can be we useful, for example, as it provides the baby carrier 2000 with a relatively small footprint, thus making it easier for the adult to operate the baby carrier 2000 is small or confined spaces.

Figure 21:
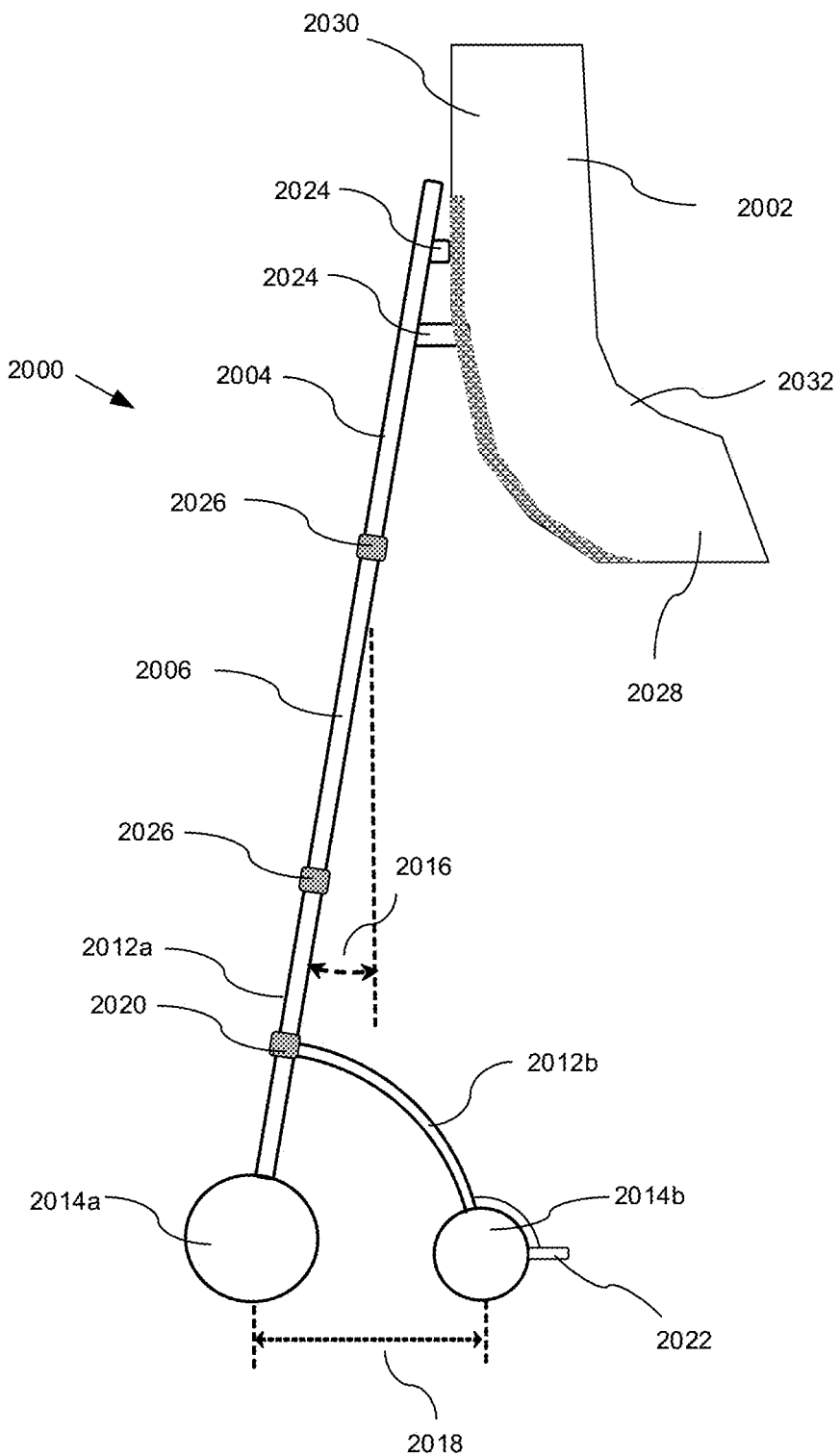
FIGS. 21 and 22 show side and front views, respectively, of the baby carrier of FIG. 20.
Figure 22:
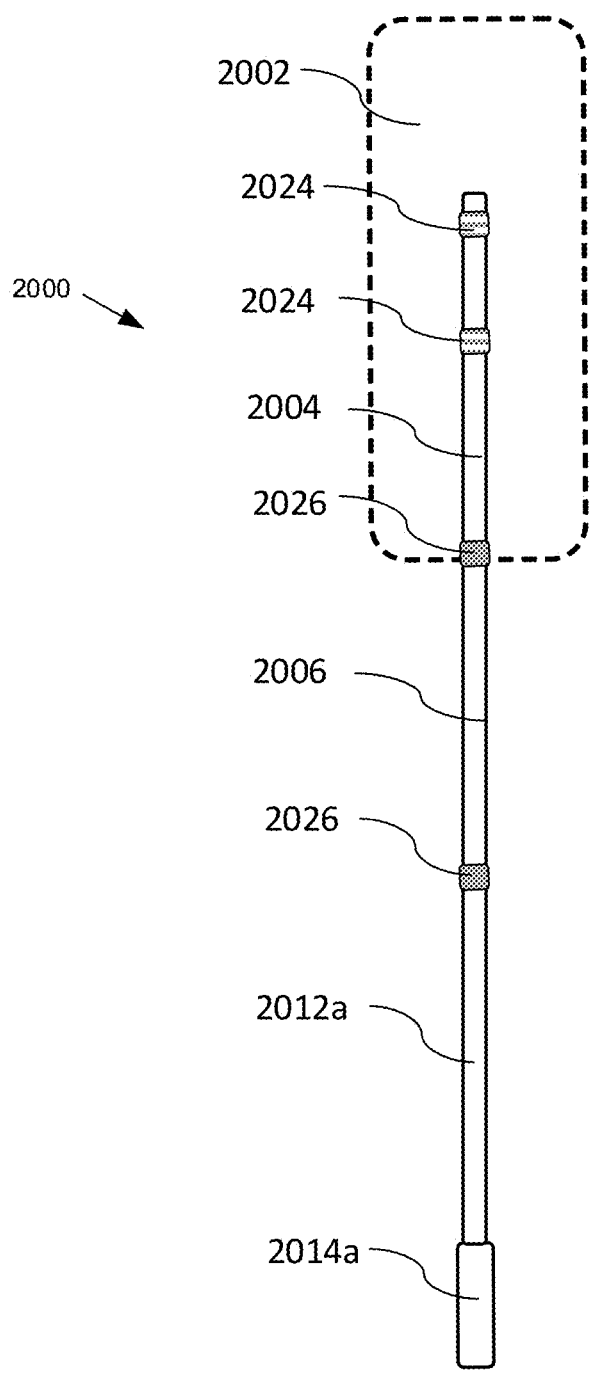

FIGS. 21 and 22 show side and front views of the baby carrier 2000 of FIG. 20. Here, the baby carrier 2000 is shown without an attachment harness being worn by the adult. The baby carrier 2000 includes a sitting element 2002 secured to a monopod 2004 through support beams 2024. In some cases, the support beams 2024 can be configured to detachably secure the sitting element 2002 to the monopod 2004 (e.g., through a detachable securing mechanism, such as a releasable bracket). The monopod 2004, in turn, is secured to the wheeled support frame 2006. The wheeled support frame 2006 includes two legs 2012a and 2012b, each equipped with a wheel 2014a or 2014b. The leg 2012b also includes a brake 2022. Adjusting blocks 2026 are used to telescopically adjust the monopod 2004 and the leg 2012a. The leg 2012b is slideably coupled to the leg 2012a through a sliding joint or coupling 2020, such that the leg 2012b can slide up or down along the length of the leg 2012a to adjust the distance 2018 between the wheels 2014a and 2014b and the incline angle 2016. The support beams 2024 connecting the support frame 2026 and the sitting element 2002 are rigid. The dark shaded portion of the sitting element 2002 indicates the backbone of the sitting element. The seat backbone is rigid, providing solid weight support for the baby or toddler. Together with the rigid support frame, rigid support beams and the rigid backbones of the seat, firm weight support can be provided from the ground to the baby or toddler, thus reducing the carrying load of the adult.

In some cases, the adjusting blocks 2026 enable the upper portion of the leg 2012a, the lower portion of the leg 2012a, and the monopod 2004 to collectively telescope together one another (e.g., such that some, all, or substantially all of the upper portion of the leg 2012a, the lower portion of the leg 2012a, and the monopod 2004 are telescoped together in an overlapping fashion). In some cases, the upper portion of the leg 2012a, the lower portion of the leg 2012a, and the monopod 2004 can each be approximately the same length (e.g., within 5%, 10%, or 15% of each other), such that when they are telescoped together, the collective length of the legs is the substantially the length of a single one of the legs. This can be useful, for example, as it enables the device to be collapsed into a small form factor for carrying (e.g., approximately one third of its fully extended length). In some cases, additional adjusting blocks 2026 can be used to further reduce the form factor of the baby carrier when each of the legs are telescoped together.

In some cases, although the upper portion of the leg 2012a, the lower portion of the leg 2012a, and the monopod 2004 can be telescoped with respect to each other, each of these legs can form substantially a straight and rigid support beam. This can be useful, for example, as it can provide a stable structural support for the seating element. Further, in some cases, this may provide increased stability relative to a support beam that is bent or angled along its length.

The sitting element 2002 has a curved shape, and is configured to provide a secure seating surface of the baby or toddler 2010. For example, the sitting element 2002 can include a lower surface 2028 (for supporting the baby or toddler's bottom) that gradually curves into a back surface 2030 (for supporting the baby or toddler's back). Further, the sitting element 2002 can include side surfaces 2032 that flare upward from the lower surface 2028 (for supporting the baby or toddler's sides and/or to prevent the baby or toddler from slipping out of the side of the sitting element 2002). Collectively, these surfaces form a partial enclosure, seat, or "pod" for holding the baby or toddler 2010. In some cases, the sitting element 2002 (e.g., the lower surface 2028, the back surface 2030, and the side surfaces 2032) can be integrally formed. In some cases, the seat element 2002 can be constructed with flexible, yet tough material that has weight bearing capability and can be folded for storage (e.g., strengthened fabric, flexible plastic, etc.). Backbones providing support strength can be added when using flexible or soft material such as specialized fabric.

In some cases, the sitting element 2002 can be rigidly coupled to the support frame 2006. This can be useful, for example, as it enables the sitting element 2002 and support frame 2006 to securely and stably support the weight of the baby or toddler 2010 (e.g., such that the sitting element 2002 does not move relative to the support frame 2006 when a baby or toddler 2010 is placed upon it). In some cases, the sitting element 2002 can be rigidly coupled to the support frame 2006 in a reversible manner (e.g., through a telescoping mechanism and a locking adjusting block) so that the sitting element 2002 can be adjusted as needed, then locked to support the weight of the baby or toddler 2010.

In some cases, the position and/or orientation of the sitting element 2002 can be adjusted. For example, as noted above, the sitting element 2002 can be rigidly coupled to the support frame 2006 in a reversible manner, such that the sitting element 2006 can be adjusted as needed (e.g., extended from the support frame 2006 or retracted into the support frame 2006), then locked to support the weight of the baby or toddler 2010. As another example, the sitting element 2002 can be rotated or tilted with respect to one or more axes or directions (e.g., with respect to the x-axis, y-axis, and/or z-axis, or any other axes). In some cases, the sitting element 2002 can be "pitched," "yawed," and/or "rolled" with respect to three different axes.

In some cases, the sitting element 2002 can be semi-rigidly coupled to the support frame 1405 through a suspension system 2042 (e.g., a suspension system having one or more springs, dampers, or other shock-absorbing mechanisms) to reduce the transfer of forces from the support frame 2006 to the sitting element 2002 (e.g., shocks due to movement of the baby carrier 2000 along the ground). In some cases, the suspension system 2042 can provide varying amounts of shock absorption or rigidity with respect to different axes or directions. For example, in some cases, the suspension system can provide relatively less rigidity with respect to rotation of the sitting element 2002 in the x-axis (e.g., "pitch") and relatively more rigidity with respect to rotation of the sitting element 2002 in the y and z axes (e.g., "yaw" and "roll"). This may be useful, for example, as it provides shock protection for the baby or toddler, while also reducing the likelihood that the baby or toddler will become mis-centered (e.g., swiveled left or right away from the carrying individual).

In some cases, the sitting element 2002 can include a shock absorbent material. For example, the sitting element 2002 can include a seat or cushion constructed from a compliant, elastic, and/or flexible material (e.g., cloth, rubber, silicone, foam, or other material). This can be useful, for example, in improving the comfort of the baby or toddler 1401 during use (e.g., by reducing shock when the baby carrier 2000 is being moved). In some cases, shock absorption can be provided through a shock damping mechanism in the support leg assembly. In some cases, shock absorption can be provided via a shock damping mechanism in the junction between the support leg assembly and the seat assembly. In some cases, shock absorption can be provided via a shock damping mechanism in the junction between the baby and the seat assembly.

In some cases, each of the wheels 2014a and 2014b can be similar or identical. In some cases, the wheels 2014a and 2014b can be different. For example, as shown in FIG. 21, the wheel 2014a on the leg 2012a can have a larger diameter than the wheel 2014b on the leg 2012b. This can be useful, for example, if the baby carrier 2000 is used in an inclined position. Nevertheless, in some cases, the wheels 2014a-b can have similar or identical diameters.

Figure 27:
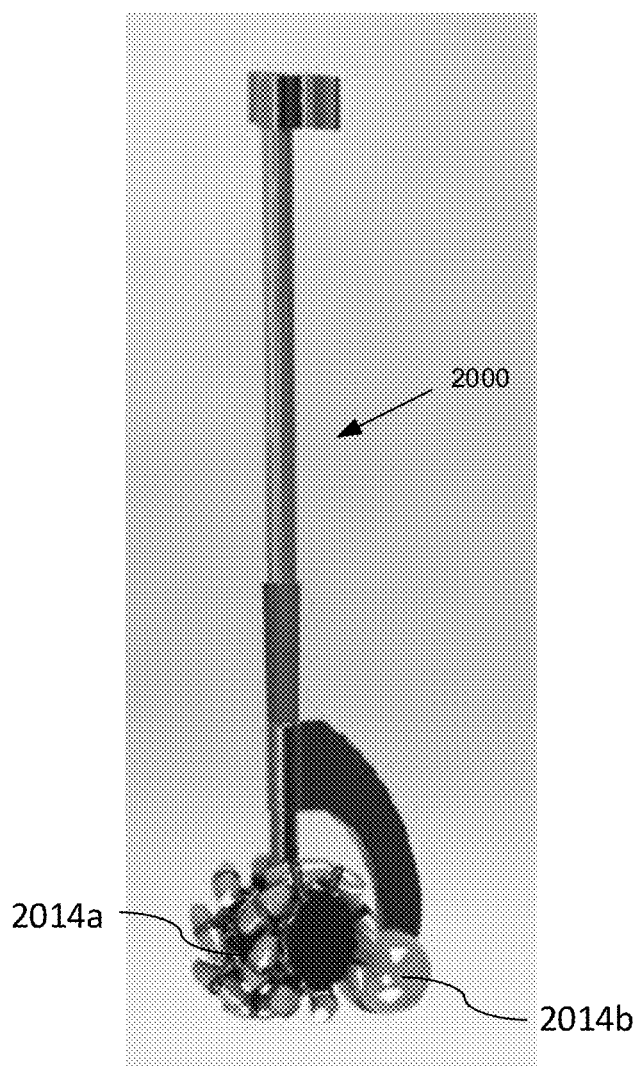
FIG. 27 shows an example baby carrier having a Mecanum wheel.

In some cases, the wheels 2014a and 2014b can each be traditional wheels (e.g., a wheel having a rotating disk or roller mounted to an axle). In some cases, one or more of the wheels 2014a and 2014b can be a Mecanum wheel (i.e., a wheel designed to move a vehicle in any dimension along the ground). For example, as shown in FIG. 27, a baby carrier 2000 can include a Mecanum wheel 2014a as a front wheel, and a traditional wheel 2014b as a back wheel. A user can move the baby carrier 2000 in any dimension along the ground by picking the back wheel 2014b off the ground while maintaining contact between the ground and the front wheel 2014a, and freely moving the baby carrier 2000 to the left or right and/or backwards or forwards.

In some cases, the brake 2022 can be an event triggered brake that applies brake force to the wheel 2014b upon detection of certain event occurring. For example, the brake 2022 can apply braking force if the wheel slips backwards by a certain distance or as soon as backward slipping is detected, indicating the potential tilt of the device in forward direction, and/or if the wheels slide sideways indicating potential tilt of the device sideways.

Figure 28:
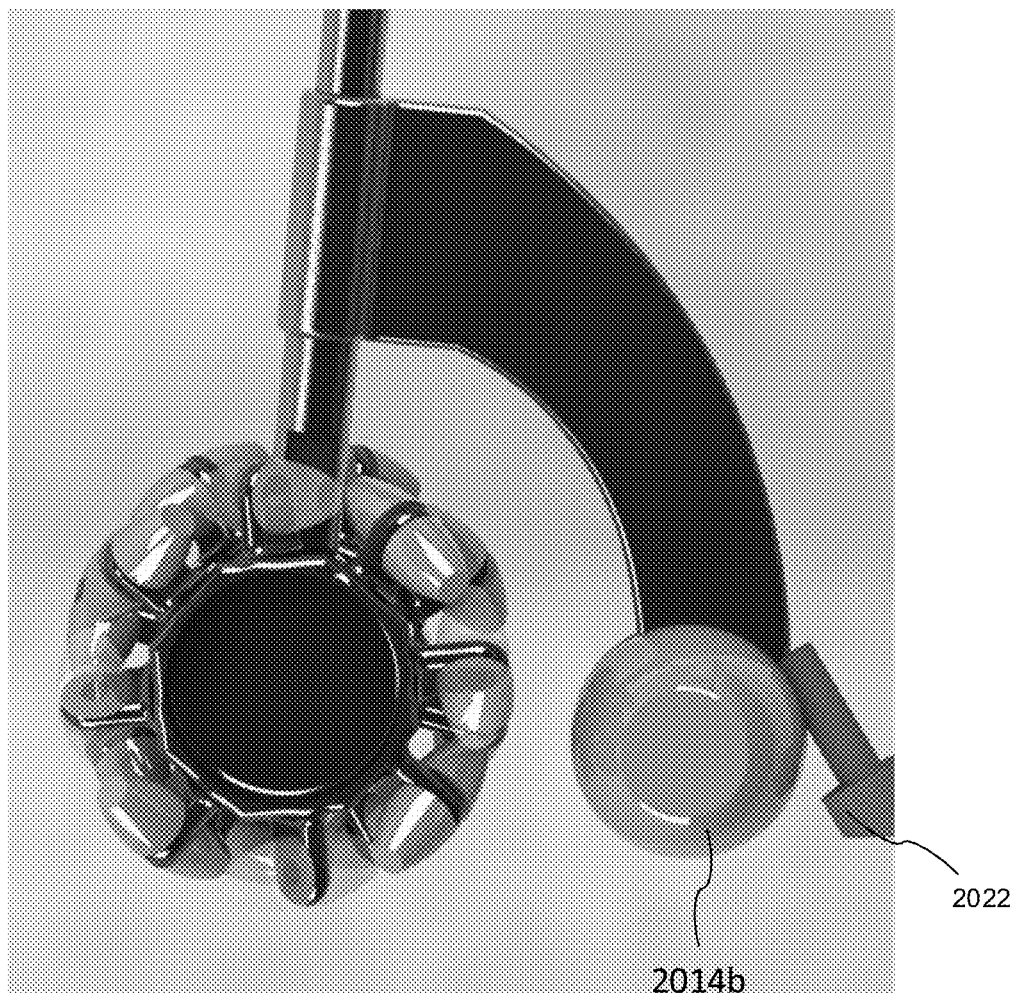
FIG. 28 shows an example brake.

In some cases, the brake 2022 can be an adaptive brake that applies a variable braking force to the wheel 2014b. In some cases, the variable braking force can depend on the incline angle 2016. For example, the brake 2022 can be configured such that that braking force applied to the wheel 2014b monotonically increases as the incline angle 2016 increases (e.g., by sensing a pressure applied to the brake 2022 as the baby carrier 2000 is tipped from the vertical). This can be useful, for example, in improving the stability of the baby carrier 2000 over a wide range of orientations. In some cases, the braking force can fully lock the wheel 2014b when the incline angle 2016 exceeds a particular threshold angle (e.g., 12° to 15°). This can be useful, for example, as it can prevent or otherwise reduce the likelihood of the baby carrier 2000 falling over. An example of the brake 2022 is shown in greater detail in FIG. 28.

Figure 29:
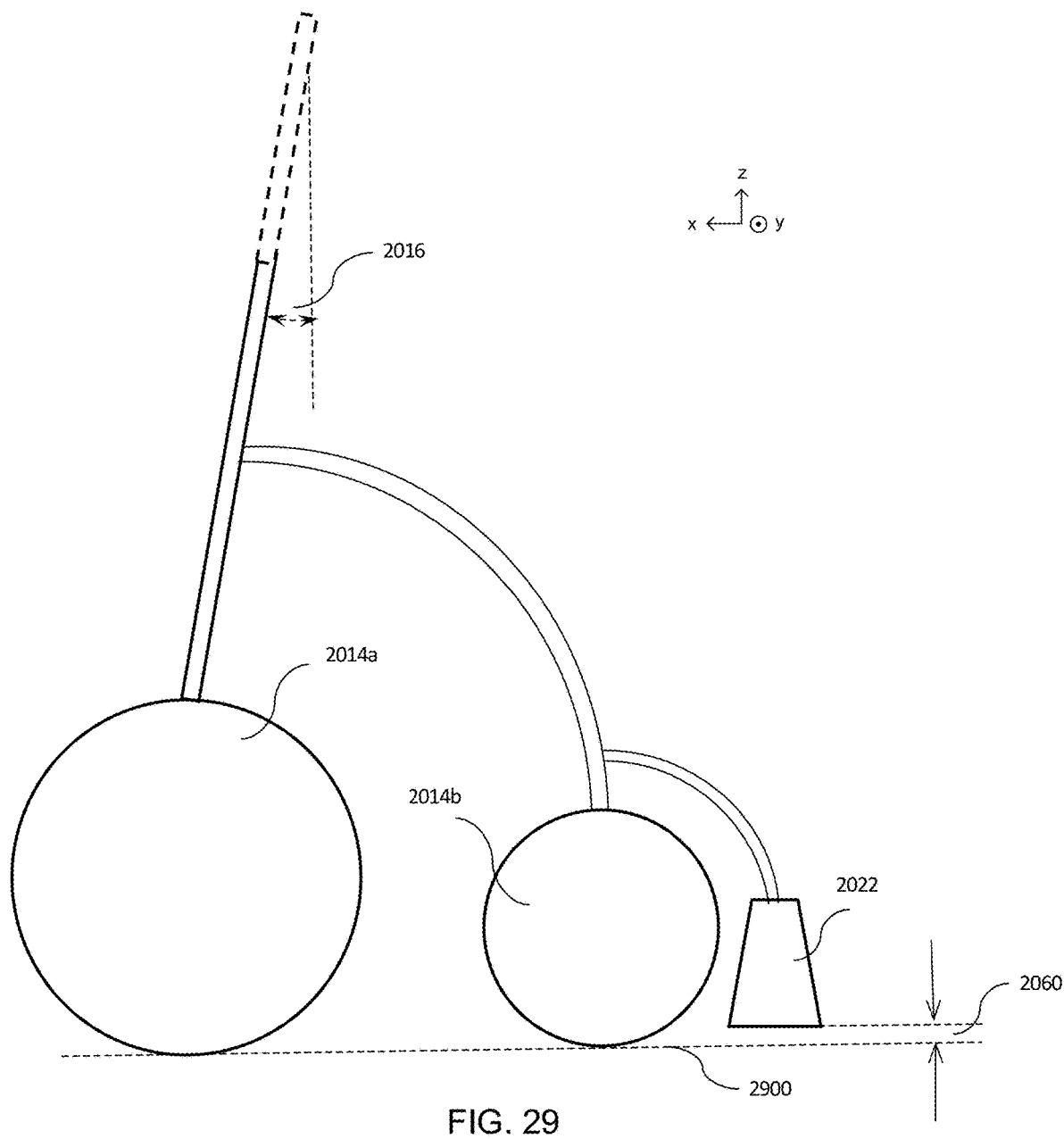
FIG. 29 shows another example brake.

The brake 2022 is also shown in FIG. 29. As shown in FIG. 29, brake 2022 is positioned behind the back wheel 2014b. The distance 2060 between the bottom of the brake 2022 and the floor 2900 can be adjusted based on the desired braking activation angle threshold. For example, when the baby carrier tilts such that the pitch angle 2016 of the first leg 2012a with respect to the z-axis in the x-z plane increases to a degree such that the distance 2060 becomes zero, the brake 2022 activates (e.g., contacts the floor 2900 to provide braking force). In practice, the distance 2060 can vary.

Figure 30:
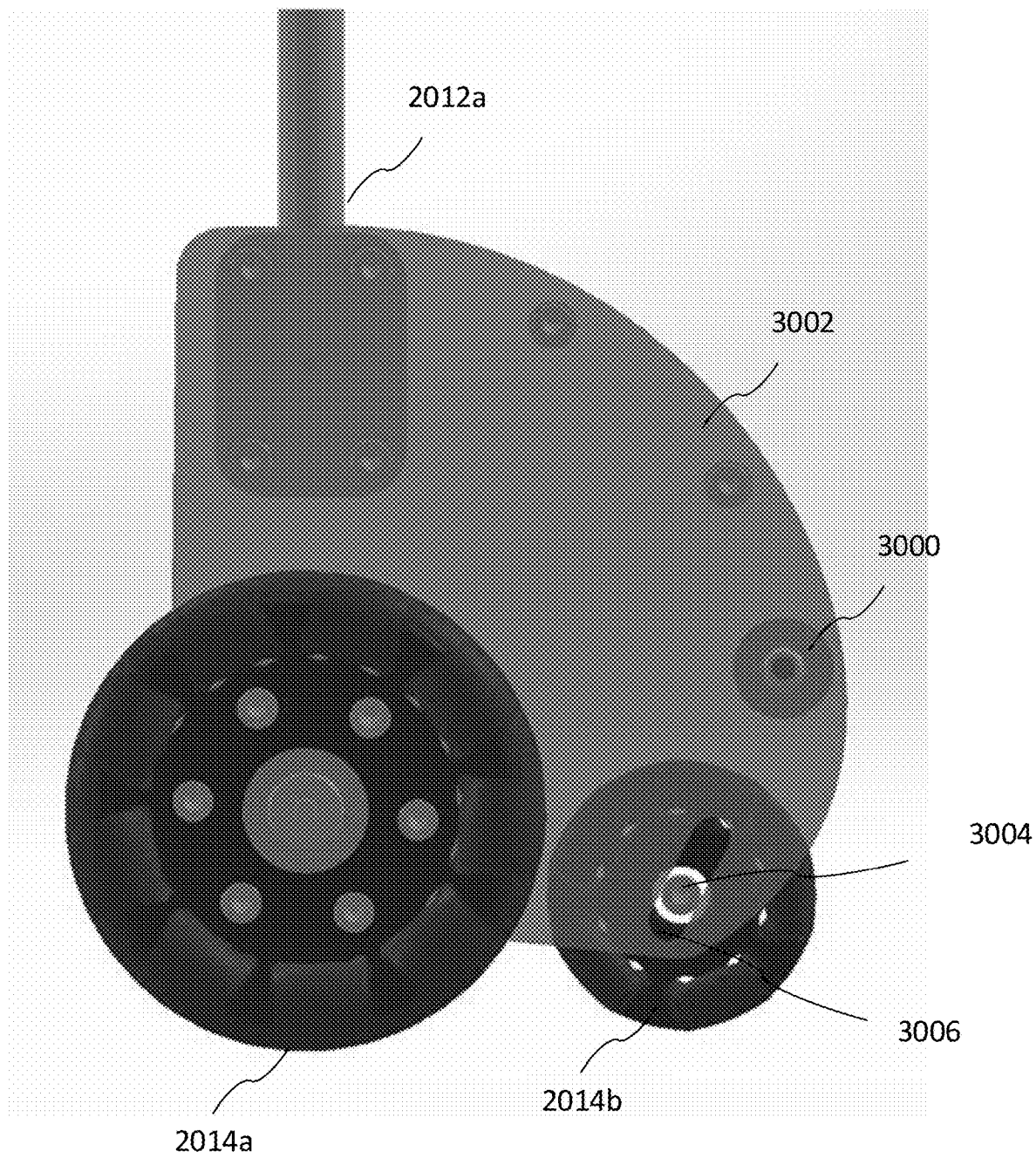
FIGS. 30 and 31 show another example brake.

Another example brake 3000 is shown in FIG. 30. In this example, the wheels 2014a and 2014b are mounted against a guide plate 3002. In some cases, the wheels 2014a and 2014b can be double wheels, with guide plate 3002 situated between each of the double wheel pairs. In some cases, the wheels 2014a and 2014b can be double wheels, mounted between two pieces of identical guide plates 3002. Guide plate 3002 is a fixed plate extended from the support leg, equipped with fixed through holes to the mount axles for front wheel 2014a and for brake 3000. The guide plate 3002 also has a through groove 3006, an open area with an extended length which allows the axle 3004 of the back wheel 2014b to slide freely when the tilt angle 2016 of the support frame changes from 0° (fully upright) to the critical braking angle. The shape of the groove 3006 may adopt a near rectangular arch opening covering the allowed moving range of axle 3004. The axle 3004 can slide along the length of the grooves 3006 to reposition the back wheel 2014b relative to the guide plates 3002 and the brake 3000. In some implementations, the back wheel 2014b always touches the ground during use (e.g., while supporting the weight of a baby), due to gravity, providing an additional ground point thus increased stability for the baby carrier. When the support frame tilt angle 2016 changes, the axle 3004 can slide to and maintain the specific equilibrium position along the groove 3006. This can be useful, for example, as it enables the back wheel 2014b to remain flush with the ground, even as the baby carrier is being repositioned according to a variety of incline angles 2016.

As shown in FIG. 30, when the baby carrier is relatively upright (e.g., when the leg 2012a is substantially vertical and the incline angle 2016 is approximately zero), the axle 3004 slides away from the brake 3000 along the grooves 3006, such that the back wheel 2014b does not contact the brake 3000. Accordingly, the back wheel 2014b is free to rotate about the axle 3004.

Figure 31:
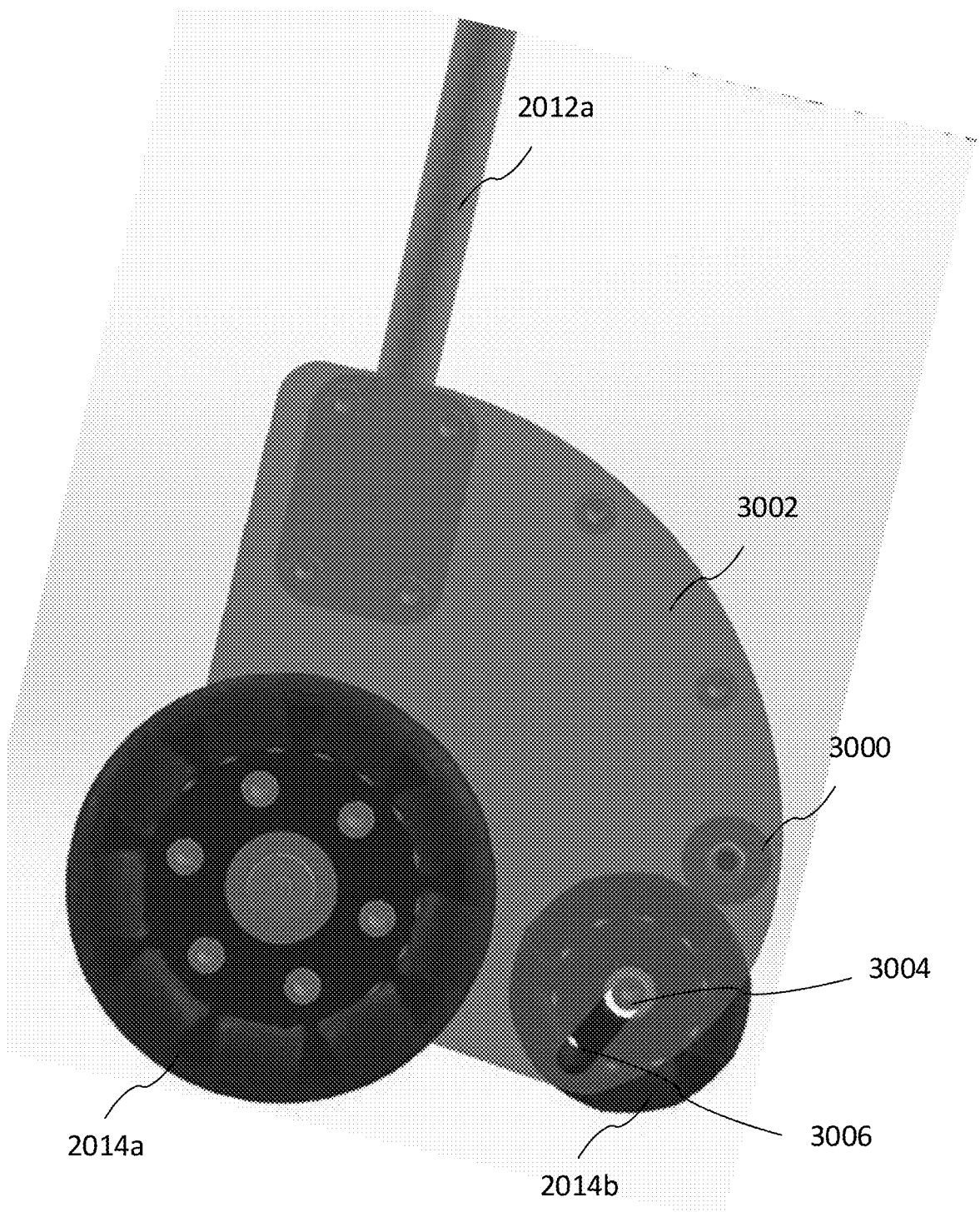

As shown in FIG. 31, when the baby carrier is tilted (e.g., such that the incline angle 2016 is increased), the axle 3004 slides towards the brake 3000 along the groove 3006 due to the position of the back wheel 2014b against the ground. If the incline angle 2016 is sufficiently great (e.g., exceeding a particular threshold angle), the back wheel 2014b contacts the brake 3000. Accordingly, the brake 3000 applies a brake force to the back wheel 2014b, thereby restricting the rotation of the back wheel 2014b. As the baby carrier tilts towards the adult, reaching and passing the critical tilt angle, the brake 3000 will "kick start" (e.g., begin to touch the back wheel 2014b) and the braking force increases with respect to the increase of the tilt angle, until a full brake is accomplished. Although an example arrangement in shown in FIGS. 30 and 31, this is merely an illustrative example. In practice, these components can be arranged differently, such that a braking pressure is applied at different threshold angles.

In some cases, one or more wheels can more freely rotate in one direction relative to other directions. For instance, in some cases, one or more wheels can freely rotate in a first direction such that the baby carrier 2000 can be moved forward easily, but is more restrictive in the opposite direction such that the baby carrier 2000 cannot move backwards as easily. As an example, in the example shown in FIG. 21, the wheel 2014a can rotate freely in both directions (e.g., both forwards and backwards), while the wheel 2014b can freely rotate forwards, but is more restrictive with respect to rotating backwards. This may be useful, for example, in improving the stability of the baby carrier during use. In some cases, one or more wheels can be entirely restricted with respect to a particular direction, but that the baby carrier 2000 cannot substantially move in that direction via those wheels. In some cases, the back wheel 2014b can be restricted such that it can only rotate forward. Thus, the baby carrier cannot roll backwards through the rotation of the wheel. This can be useful, for example, in enhancing the safety of the baby carrier during operation (e.g., by preventing or otherwise reducing the likelihood of the bottom of the baby carrier moving backwards while the adult is carrying the baby, which might result in the top of the baby carrier and the baby falling forward and away from the adult).

In practice, the incline angle 2016 can vary, depending on the implementation. For example, when the baby carrier is in a deployed position, the pitch incline angle 2016 can be between 5° and 20° (e.g., between 8° and 12°).

Further, the angle 2034 between the legs 2012a and 2012b can vary. For example, when the baby carrier is in a deployed position, the angle between the legs 2012a and 2012b can be between 25° and 45° (e.g., 33.3°). In some cases, these angles can be beneficial, as they enable the baby carrier to support the baby stably, and in a position that is comfortable to the adult (e.g., by providing an asymmetrical configuration that positions the baby stably and securely closer to the adult). Although example angles are described above, other angles are also possible, depending on the implementation.

Further, the lengths of each of the legs 2012a and 2012b and the monopod 2004 also can vary, depending on the implementation. For example, in some cases, the leg 2012a can have a length 2036 between 35 inches and 50 inches, the leg 2012b can have a length 2038 between 8 inches to 10 inches, and the monopod 2004 can have a length 2040 between 8 inches and 18 inches. In some cases, these lengths can be beneficial, as they enable the baby carrier to support the baby stably, and in a position that is comfortable to the adult. Although example lengths are described above, other lengths are also possible, depending on the implementation.

In some cases, one or more of the leg 2012a, the leg 2012b, and/or the monopod 2004 can be collapsed. For example, in some cases, the leg 2012a can include two telescoping segments, each approximately 18 inches in length. One segment can be collapsed into another so that the total length of the leg 2012a in the collapsed configuration is approximately 18 inches, and the total length of the leg 2012 in an extended configuration is approximately 36 inches. Further, the monopod 2004 can also have a length of approximately 18 inches, and can either be extended from the leg 2012a, or collapsed into the leg 2012a. Thus, in some cases, the baby carrier 2000 can have a total length between approximately 18 inches (e.g., in a fully collapsed state) and 54 inches (e.g., in a fully extended state). Although example lengths are described above, other lengths are also possible, depending on the implementation.

In some cases (e.g., as shown in FIG. 21), the leg 2012b can be bent or curved. In these cases, the length of the leg 2012b can refer to the linear distance between the opposing ends of the leg 2012b (e.g., as if the leg 2012b were straight), and the angle between the leg 2012a and a line between the opposing ends of the leg 2012b (e.g., as if the leg 2012b were straight).

Figure 23:
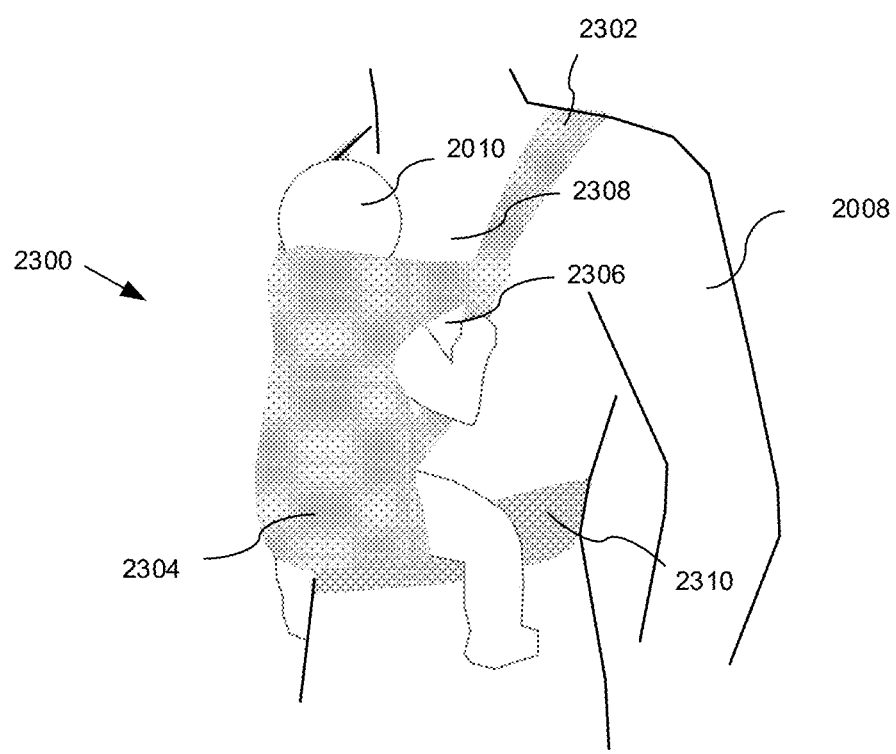
FIG. 23 shows an example harness for securing a baby to an adult.

In some cases, the baby carrier 2000 can include a harness configured to secure the baby or toddler 2010 to the carrying individual 2008. An example harness 2300 is shown in FIG. 23. The harness can be similar to that shown in FIG. 16. For example, the harness 2300 can include two shoulder straps 2302 extending from a central portion 2304. The harness 2300 can also define gaps 2306 between the shoulder straps 2302 and the central portion 2304, such that a baby or toddler's arms can pass, and a gap 2308 between the shoulder straps, such that the baby toddler's head (and the carrying individual's head) can pass. The harness 2300 can also include a waistband 2310 configured to encircle the carrying individual's waist, such that the bottom of the central portion 2304 is held tightly against the carrying individual. As above, the harness 2300 is configured such that during use, the shoulder straps 2302 loop around the carrying individual's shoulders, and the central portion 2304 is positioned on the torso of the carrying individual 2008, forming a supportive pouch. The carrying individual 2008 can place the baby or toddler 2010 into the pouch (e.g., between the central portion 2304 and her torso), such that the baby or toddler 2010 is secured to the carrying individual's body. In some cases, the harness 2300 can be formed from a flexible, compliant, and/or soft material (e.g., cloth, rubber, silicone, plastic, or any other material), such that it can be readily conform to the dimensions of the carrying individual and the baby or toddler 2010. In some cases, the harness 2300 can include one or more "non-slip" surfaces (e.g., rubber, foam, and/or patterned surfaces) that increase the friction between the harness 2300 can the carrying individual, such that the harness 2300 is less like to slip off of the carrying individual during use.

In some cases, the coupling between the sitting element, together with its support link, and the attachment harness can be semi-rigid, which enables the sitting element to have at least four of the six degrees of freedom of adjustment (e.g., linear translation with respect to the x-, y-, and z-axes, as well as rotation about those axes, such as pitch, yaw, and roll). As an example, each support link can be constructed from a semi-rigid material, such as cloth, rubber, and/or a flexible plastic, metal, or other material.

When deployed, the adjustment, the seating assembly can have a semi-rigid attachment to the attachment harness with the six degrees of freedom in adjustments, where rigidity in certain directions are less than other directions (e.g., less in Y, than in X or Z), and/or less in certain rotational directions than other directions (e.g., less in pitch than in yaw or roll).

The support frame assembly raises the harness and seating assembly by a non-trivial amount (e.g., half inch) above the comparable rest position of those without using the support frame (when decoupled from the baby carrier), thus providing substantial weight support to the baby or toddler from the floor surface, reducing the carrying load to the carrying adult by a non-trivial amount, (e.g., at least 75%).

In a similar manner as described with respect to FIG. 17, the baby carrier 2000 can be configured such that the weight of the baby or toddler 2010 is distributed between the baby carrier 2000 and the carrying individual's shoulders during use. For example, as shown in FIG. 20, the baby carrier 2000 can be configured such the sitting element 2002 is adjustable to approximately the height of the carrying individual's waist, or a particular distance higher than the height of the carrying individual waist (e.g., approximately one inch above the height of the carrying individual's waist, or some other distance. Further, the harness 2300 can be configured such that when the baby or toddler 2010 is placed within it, the baby or toddler 2010 is positioned at approximately the height of the carrying individuals' waist. This enables the carrying individual to comfortably place the baby or toddler 2010 onto the sitting element 2002. Further, although the baby or toddler 2010 is sitting on the sitting element 2002, at least some of the weight of the baby or toddler 2010 is supported by the harness 2300 (and in turn, by the carrying individuals' shoulders). This can be useful, for example, as it enables the carrying individual to support the baby or toddler 2010 more easily (as the baby or toddler's weight is distributed between the sitting element 2002 and her shoulders). In some cases, in this configuration, the sitting element 2002 can support between 1 to 99% of the baby or toddler's weight (e.g., 10%, 20%, 30%, 40%, 50%, 60%, 70%, 80%, 90%, or some other percentage). In some cases, in this configuration, the carrying individual's shoulders can support between 1 to 99% of the baby or toddler's weight (e.g., 10%, 20%, 30%, 40%, 50%, 60%, 70%, 80%, 90%, or some other percentage). As an example, in some cases, the baby carrier 2000 can be configured such that when the baby carrier 2000 is oriented with an incline angle 2016 of approximately 8° and 12° and a baby or toddler is placed onto the sitting element, the baby carrier 2000 supports approximately 75% to 90% of the baby or toddler's weight. As another example, in some cases, when the baby carrier 2000 is being used in a "walking" configuration (e.g., when a baby or toddler is placed onto the sitting element, and a carrying individual is moving the baby carrier with her as she walks), the baby carrier 2000 supports approximately 80% of the baby's or toddler's weight. As another example, in some cases, when the baby carrier 2000 is being used in a "stationary" configuration (e.g., when a baby or toddler is placed onto the sitting element, and a carrying individual is not walking or moving the baby carrier 2000), the baby carrier 2000 supports approximately all of the baby's or toddler's weight. In practice, this distribution can be modified to suit each particular application. Further, in some cases, the baby carrier 2000 can be adjusted to position the baby or toddler at different heights with respect to the carrying individual (e.g., at the carrying individual's chest).

Figure 24:
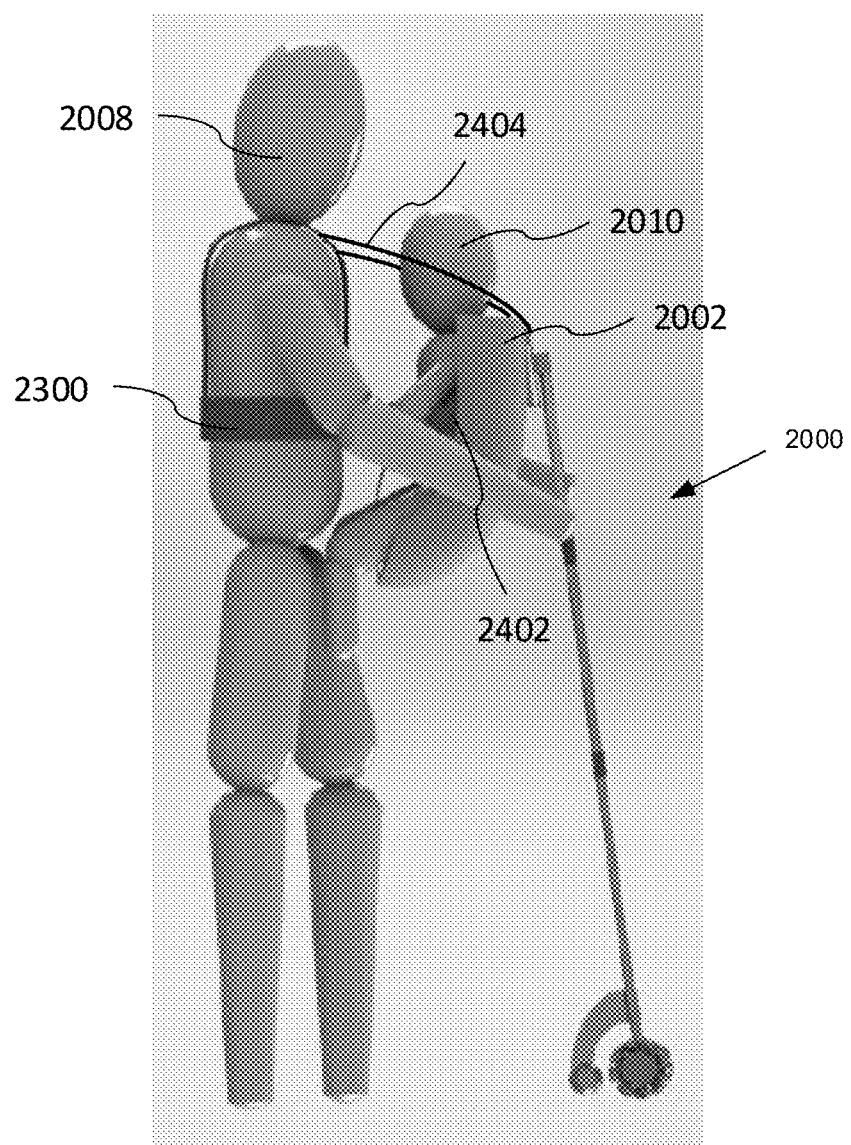
FIG. 24 shows an example baby carrier in operation where an adult is holding a baby in the front of the adult's body and the baby is sitting on the baby carrier facing towards the adult.
Figure 25:
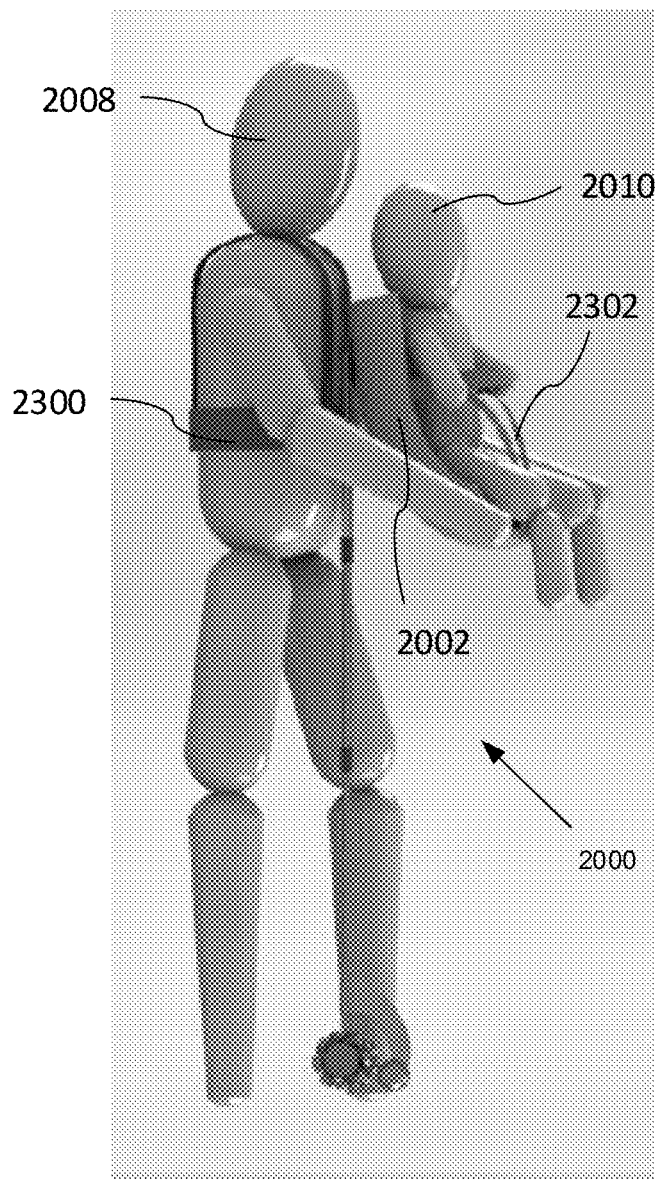
FIG. 25 shows an example baby carrier in operation where an adult is holding a baby in the front of the adult's body and the baby is sitting on the baby carrier facing away from the adult and the support frame of the baby carrier is reversed (e.g., in a standing mode).
Figure 26:
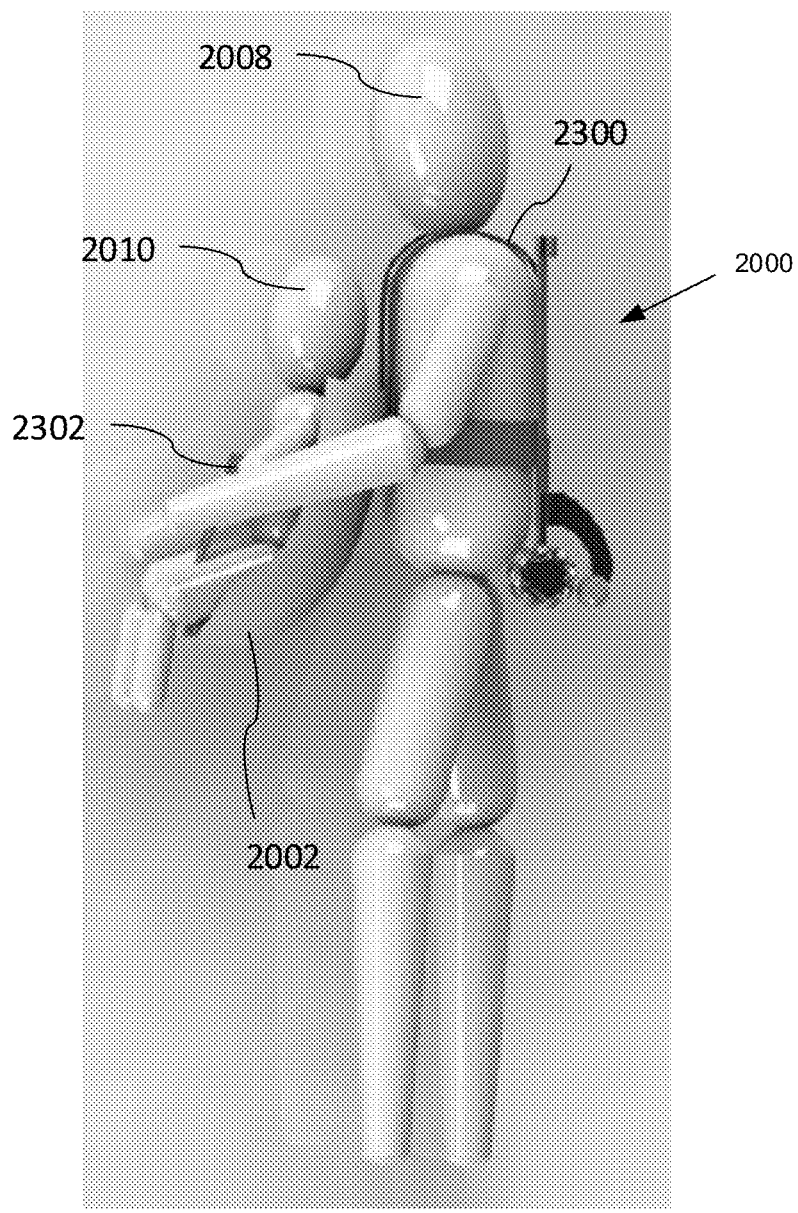
FIG. 26 shows an example baby carrier in operation where the baby carrier is stowed.

Although a harness is shown in FIGS. 20 and 23, this is merely an illustrative example. Other harnesses are also possible. For example, as shown in FIG. 24-26, a baby carrier 2000 can include a harness 2300 similar to that shown in FIG. 11 (e.g., having shoulder straps and a waistband configured to fit a carrying individual 2008 during use). Similarly, baby carrier 2000 can be attached to the harness through a cord or support link.

In some cases, as shown in FIG. 24, the baby carrier 2000 can also include a baby harness 2402 having shoulder straps and a waistband configured to secure the baby or toddler 2010 to the sitting element 2002 during use. This can be beneficial, for example, as it enables the baby or toddler 2010 to be more securely attached to the baby carrier 2000.

Further, as shown in FIG. 24, the baby carrier 2000 can include one or more support links 2404 extending between the primary portion of the baby carrier 2000 (e.g., the sitting element 2002, the support frame 2006, or some other portion of the baby carrier 2000) to the adult harness 2300 (e.g., to a shoulder strap, the waist band, or some other portion of the harness 2300). This can be useful, for example, as it secures the baby carrier 2000 to the carrying individual, such that the baby carrier 2000 is less likely to fall, or become separated and lost. Further, this maintains a comfortable distance between the baby and adult in operation. Further still, the support links 2404 can transfer some of the weight of carrying the baby carrier 2000 (and the baby or toddler 2010) onto the harness 2300, which may make the baby carrier 2000 more comfortable to use (e.g., by enabling the adult to bear some or all of the weight of the with her shoulders rather than entirely with her arms). In some cases, the baby carrier 2000 can include at least two support links 2404, each extending from a respective side of the baby carrier 2000 (e.g., from the left or right) to a respective side of the harness 2300 (e.g., to the left or right shoulder straps). This can beneficial, for example, as it provides balanced support with respect to both sides of the baby carrier 2000, thereby keeping the baby carrier 2000 stable during use.

Further, this can be beneficial, for example, as it transfers the weight of the baby carrier 2000 (and the baby or toddler 2010) to the harness in a balanced manner, making the baby carrier 2000 more stable and more comfortable to use. Although two support links 2402 are shown in FIG. 24, in practice, the baby carrier 2000 can include any number of support links extending between the baby carrier 2000 and the harness 2300 (e.g., one, two, three, four, or more). In some cases, the support links can be rigid or semi-rigid.

FIGS. 24 and 25 also illustrate the adjustable incline angle of the baby carrier 2000. For example, as shown in FIG. 24, the baby carrier 2000 not vertically inclined (e.g., the axis of extension of the baby carrier 2000 is not vertical, and instead is inclined towards the carrying individual 2008). However, as shown in FIG. 25, the baby carrier 2000 is vertically inclined (e.g., the axis of extension of the baby carrier 2000 is not vertical, and instead is inclined towards the carrying individual 2008). As shown in FIGS. 20 and 21, this adjustment can be performed by repositioning one of the legs with respect to the other leg (e.g., by sliding the leg 2012b along the length of the leg 2012a), this can be useful, for example, as it enables the carrying individual 2008 to position the baby carrier 2000 more securely or comfortably. For example, as shown in FIG. 24, the carrying individual can adjust the baby carrier 2000 such that it is not vertically inclined, which may be more convenient or secure when the carrying individual is walking forward (e.g., while the baby or toddler 2010 is being held away from the carrying individual 2008). As another example, as shown in FIG. 25, the carrying individual can adjust the baby carrier 2000 such that it is vertically inclined, which may be more convenient or secure when the carrying individual is standing still (e.g., while the baby or toddler 2010 is being held toward the carrying individual 2008). In some cases, the back wheel 2014b can be equipped with a brake, such that when the brake is engaged, the baby carrier is not movable and cannot slip or otherwise move along the ground.

As shown in FIG. 26, in some cases, the baby carrier 2000 can be collapsed into a "stowed" configuration (e.g., by retracting the monopod and/or support frame). The baby carrier 2000 can be attached to the harness 2300 for transport (e.g., through mounting brackets on the baby carrier 2000 and/or the harness 2300). The sitting element 2002 can be detached, such that the carrying individual 2008 can carrying the baby or toddler 2010 without removing the baby or toddler 2010 from the seat 2002, harness 2300, and the support links 2402.

A number of implementations have been described. Nevertheless, it will be understood that various modifications may be made. For example, the baby carrier can be an add-on component to a conventional baby carrier without the monopod leg. Additionally, the monopod leg can be used as a multifunctional device to mount other objects, such as camera, bow, or other carrying loads such as backpacks, etc. The baby carrier include a storage compartment (e.g., a slide out drawer) in the sitting element. The top of the sitting element can include a compartment or other mechanism for holding an object (e.g., a baby bottle). A baby bottle could also be attached under the sitting element or on the monopod leg. The sitting element can include an attachment cable or structure for toys for the baby to play with. The monopod leg can be locked by twisting concentric sections of the monopod leg using a clockwise or counterclockwise rotating motion. The bottom of the sitting element can include rails, grooves or other mechanical structures to facilitate mating with rails, grooves or other mechanical structures in a car seat or stroller. Different telescopic mechanisms can be used to enhance stability, mobility and flexibility of the baby carrier.

Elements of one or more implementations may be combined, deleted, modified, or supplemented to form further implementations. The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A baby carrier comprising:
   an adjustable support frame comprising a first leg and a second leg,
      wherein the first leg comprises a first leg end having a first wheel configured to contact a floor surface, and
      wherein the second leg comprises:
         a second leg end having a second wheel configured to contact the floor surface, and
         a brake configured to apply a variable braking force for the second wheel,
      wherein the variable braking force depends on an angle of incline of the first leg with respect to a vertical axis;
   an adjustable seating assembly attached to the support frame and configured to support a baby or a toddler; and
   an attachment harness attached to at least one of the support frame or the seating assembly, wherein the attachment harness is configured to secure the baby carrier to an adult;
   wherein the baby carrier is configured, such that in a deployed arrangement:
      the first and the second leg ends of the support frame contact the floor surface, and
      the seating assembly is supported above the floor surface.

2. The baby carrier of claim 1, further comprising a suspension assembly disposed between the support frame and the seating assembly, wherein the suspension assembly is configured to provide shock absorption between the support frame and the seating assembly.

3. The baby carrier of claim 1, wherein the baby carrier is further configured, such that in the deployed arrangement:
   the first and the second leg ends are disposed along a common first plane extending along an x-axis and a y-axis in a Cartesian coordinate system;
   the first leg is inclined with respect to a z-axis of the Cartesian coordinate system by a first pitch angle; and
   the second leg is inclined with respect to the z-axis by a second pitch angle, wherein the first pitch angle is different than the second pitch angle.

4. The baby carrier of claim 3, wherein the first pitch angle is between 5° and 20°, and wherein the second leg is inclined with respect to the first leg by 25° to 45°.

5. The baby carrier of claim 1, wherein the second leg is coupled to the first leg through a sleeve coupling encircling a portion of the first leg, and wherein the sleeve coupling is configured to slide along a length of the first leg.

6. The baby carrier of claim 1, wherein at least one leg is telescopic.

7. The baby carrier of claim 1, wherein the first leg comprises a first leg portion and a second leg portion, wherein the first leg portion, the second leg portion, and the support frame are configured to telescope with respect to one another.

8. The baby carrier of claim 1, wherein the first leg is longer than the second leg.

9. The baby carrier of claim 8, wherein the first wheel has a larger diameter than the second wheel.

10. The baby carrier of claim 9, wherein the first wheel comprises a Mecanum wheel.

11. The baby carrier of claim 9, wherein a rotation of at least one of the first wheel or the second wheel is restricted with respect to a first direction relative to a rotation in a second direction opposite the first direction.

12. The baby carrier of claim 1, wherein the variable braking force monotonically increases as the angle of incline increases.

13. The baby carrier of claim 12, wherein the brake is configured to lock the second wheel when the angle of incline exceeds a threshold angle.

14. The baby carrier of claim 1, wherein the attachment harness comprises at least one shoulder strap configured to secure the attachment harness to a shoulder of the adult.

15. The baby carrier of claim 1, wherein the seating assembly comprises a second attachment harness configured to secure the baby or toddler to the seating assembly.

16. The baby carrier of claim 1, wherein the attachment harness comprises at least two rigid or semi-rigid support links attached to at least one of the support frame or the seating assembly.

17. The baby carrier of claim 16, wherein the at least two support links include a first support link disposed on a first side of the seating assembly, and a second support link disposed on a second side of the seating assembly opposite the first side.

18. The baby carrier of claim 1, wherein the seating assembly comprises a seat having a curved back portion configured to support a back of the baby or the toddler.

19. The baby carrier of claim 18, wherein the seat comprises a shock absorption mechanism.

20. The baby carrier of claim 19, wherein the shock absorption mechanism is configured such that it is more rigid with respect to a first axis of rotation than with respect to a second axis of rotation.

21. The baby carrier of claim 1, wherein the baby carrier is configured, such that in the deployed configuration, and when the baby or toddler is positioned on the seating assembly and the attachment harness is secured to the adult, the attachment harness supports at least a portion of a weight of the baby or the toddler.

22. The baby carrier of claim 1, wherein the baby carrier is configured, such that in the deployed arrangement, and when the baby or toddler is positioned on the seating assembly the attachment harness is secured to the adult, and the baby carrier is being moved by the adult, the support frame supports at least 90% of a portion of a weight of the baby or the toddler.

23. The baby carrier of claim 1, wherein the baby carrier is configured, such that in the deployed arrangement, and when the baby or toddler is positioned on the seating assembly the attachment harness is secured to the adult, and the baby carrier is stationary, the support frame supports at least 80% of a portion of a weight of the baby or the toddler.

* * * * *